United States Patent [19]
Hieda et al.

[11] Patent Number: 5,675,381
[45] Date of Patent: Oct. 7, 1997

[54] CONTROL OF SOLID-STATE IMAGE SENSOR

[75] Inventors: Teruo Hieda, Kawasaki; Kenji Kyuma, Yokohama; Kan Takaiwa, Hachiohji, all of Japan

[73] Assignee: Canon Kabushiki Kaisha, Tokyo, Japan

[21] Appl. No.: 483,865

[22] Filed: Jun. 7, 1995

Related U.S. Application Data

[62] Division of Ser. No. 124,627, Sep. 22, 1993, which is a continuation of Ser. No. 783,352, Oct. 28, 1991, abandoned.

[30] Foreign Application Priority Data

| Oct. 31, 1990 | [JP] | Japan | 2-291814 |
| Oct. 31, 1990 | [JP] | Japan | 2-291815 |
| Oct. 31, 1990 | [JP] | Japan | 2-291817 |
| Oct. 31, 1990 | [JP] | Japan | 2-291818 |
| Oct. 31, 1990 | [JP] | Japan | 2-291819 |
| Nov. 1, 1990 | [JP] | Japan | 2-293667 |

[51] Int. Cl.$^6$ ............................................. H04N 5/335
[52] U.S. Cl. .................................... 348/297; 348/295
[58] Field of Search .................. 348/207, 221, 348/295, 296, 297, 298, 299, 311, 312, 314, 316, 319, 320; H04N 5/335

[56] References Cited

U.S. PATENT DOCUMENTS

| 4,686,572 | 8/1987 | Takatsu | 348/294 |
| 4,782,394 | 11/1988 | Hieda | |
| 4,901,152 | 2/1990 | Hieda | |
| 4,984,002 | 1/1991 | Kokubo | |
| 5,040,070 | 8/1991 | Tsutsumi et al. | |
| 5,044,000 | 8/1991 | Iijima | 377/60 |
| 5,159,457 | 10/1992 | Kawabata | 348/312 |
| 5,194,957 | 3/1993 | Kyuma | 348/294 |
| 5,233,428 | 8/1993 | Alford et al. | |
| 5,258,845 | 11/1993 | Kyuma et al. | |

FOREIGN PATENT DOCUMENTS

| 0476936A2 | 3/1992 | European Pat. Off. |
| 2608341 | 6/1988 | France |
| 1165270 | 6/1989 | Japan |
| 1176173 | 7/1989 | Japan |
| 2142183 | 5/1990 | Japan |
| 2160060 | 12/1985 | United Kingdom |
| 200509 | 8/1988 | United Kingdom |

*Primary Examiner*—Andrew Faile
*Assistant Examiner*—Tuan V. Ho
*Attorney, Agent, or Firm*—Fitzpatrick, Cella, Harper & Scinto

[57] ABSTRACT

An apparatus for driving a solid-state image sensor includes a sensor portion for performing a photoelectric conversion, a vertical transfer register for reading information from the sensor portion, a memory for storing information from the vertical transfer register, and an eliminating unit for eliminating information from the sensor portion, wherein the information in the sensor portion is eliminated by the eliminating unit intermittently two or more times in one field interval, whereby information storage time is controlled. In one field interval, operation of the eliminating unit is performed successively every time $T_2$ after time $T_1$ from a vertical synchronizing signal, the information from the sensor portion is read in the vertical shift register successively, at every operation of the eliminating unit, a time $T_3$ after the end of this operation, and the first time $T_1$, second time $T_2$ and third time $T_3$ are controlled so as to vary independently or in association, whereby virtual storage time of the sensor portion in one field interval is controlled.

4 Claims, 21 Drawing Sheets

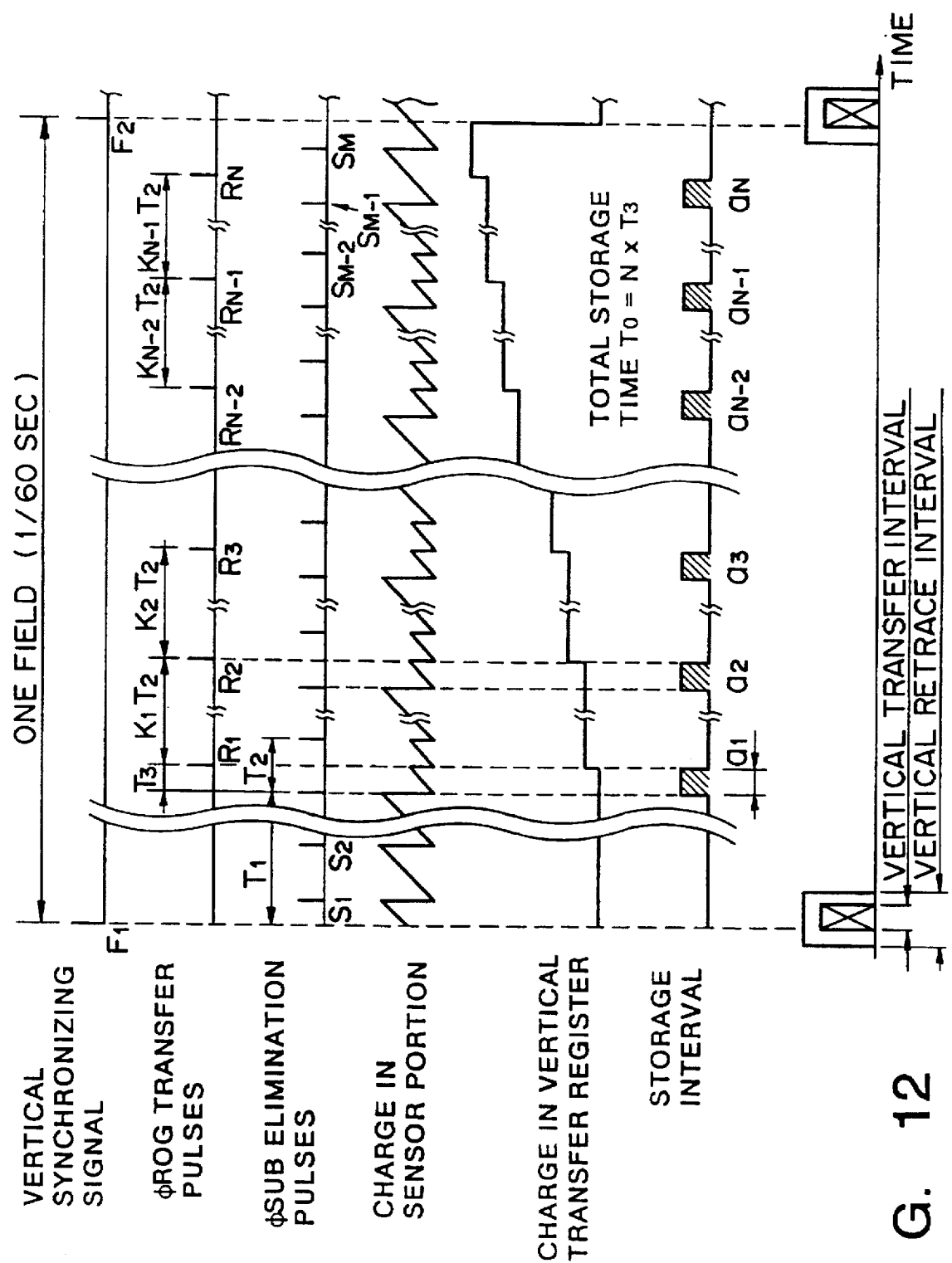
F I G. 12

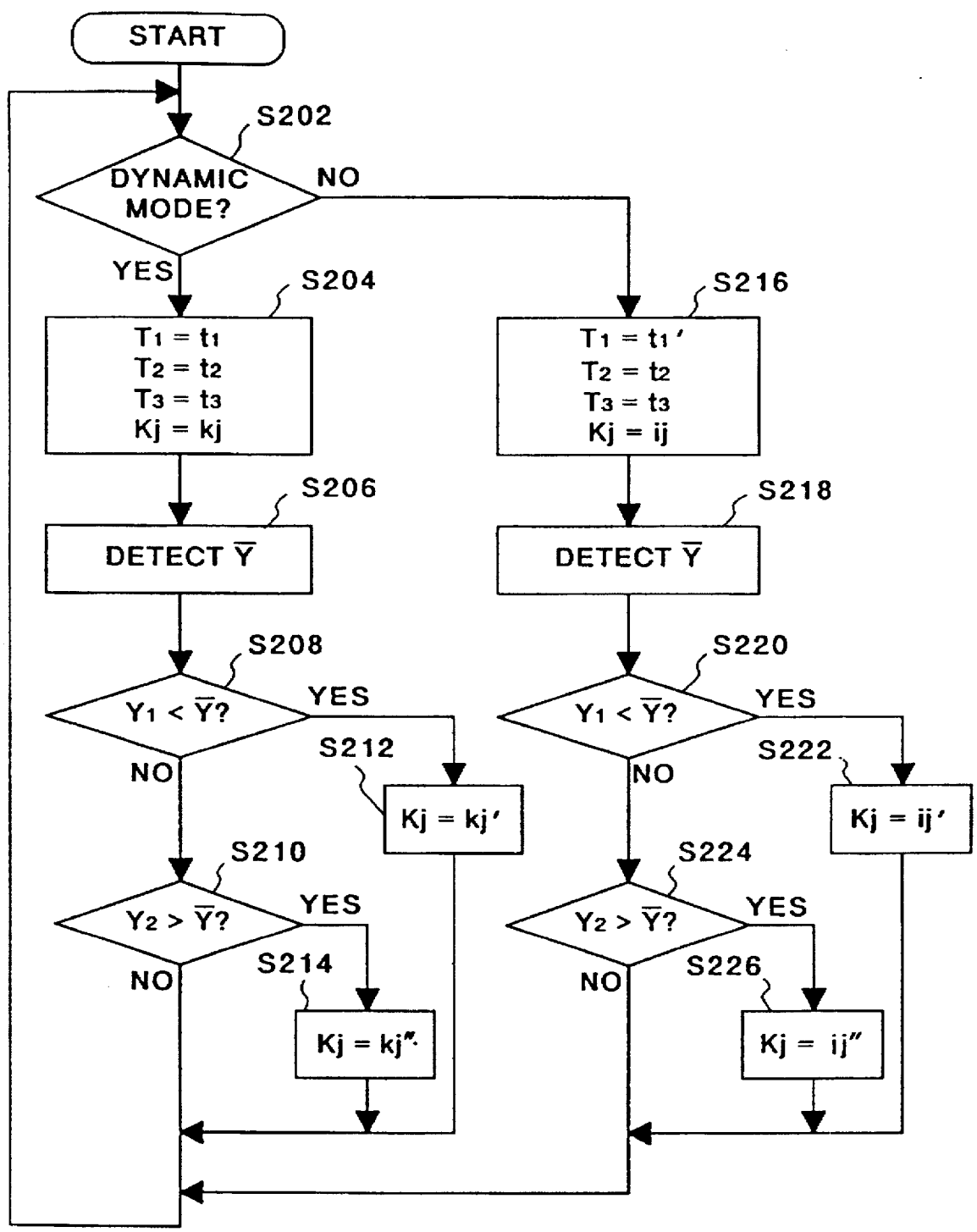
F I G. 13

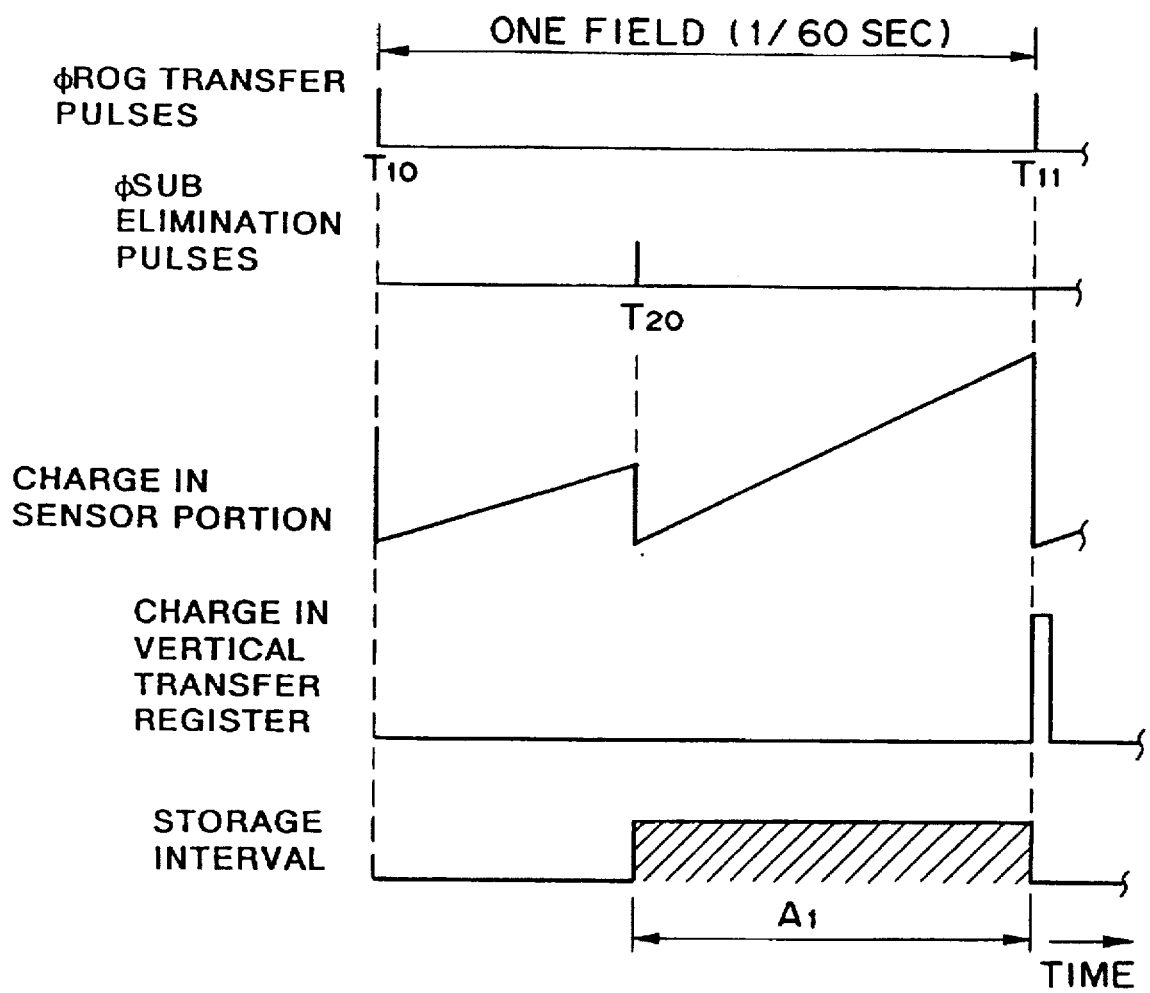
F I G. 18

CONTROL OF SOLID-STATE IMAGE SENSOR

This application is a division of application Ser. No. 08/124,627 filed Sep. 22, 1993, pending, which is a continuation application Ser. No. 08/783,352, filed Oct. 28, 1991.

BACKGROUND OF THE INVENTION

This invention relates to control of solid-state image sensors used, for example, in a video camera or the like.

Known expedients for implementing an exposure correction function in a video camera or the like include a method using a diaphragm or the like for directly controlling the amount of light incident upon an image sensor, and a method using an electronic-shutter function for controlling the charge storage time of an image sensor.

However, of the conventional methods described above, the former method, using diaphragm blades, requires not only the diaphragm blades themselves but also mechanical members peripheral thereto, as a result of which a video camera using this method is unduly large and costly. The latter method using the electronic-shutter function is disadvantageous in that the motion of the sensed image is unnatural.

The problem relating to the method using the electronic-shutter function will be described in greater detail. FIG. 1 is a plan view schematically illustrating the structure of an interline transfer-type CCD. Numeral 1 denotes a sensor which performs a photoelectric conversion, 2 a vertical transfer register, 4 a horizontal transfer register, and 5 an output amplifier.

FIG. 2 is a sectional view taken along line A–A' of the CCD of FIG. 1 and a diagram illustrating the states of potentials at various portions corresponding to this cross section.

In FIG. 2, numeral 6 denotes a channel stop (CS) for pixel separation, 7 a read-out gate (ROG) for transferring the electric charge, which has accumulated in the sensor portion 1, to the vertical transfer register 2, 8 a substrate, and 9 an oxide film.

The operation of the conventional electronic shutter will now be described with reference to FIGS. 2 and 3.

FIG. 3 is a timing chart of various signals in one field interval T of a standard television signal. A $\phi$ROG pulse is a pulse applied to the read-out gate (ROG) 7. When the logic level of this pulse is "H" (high) the potential of the read-out gate (ROG) 7 falls and the electric charge in the sensor portion 1 is transferred to the vertical transfer register 2. An elimination pulse $\phi$SUB is applied to the substrate 8. When this pulse is "H", the electric charge which has accumulated in the sensor portion 1 is swept out (eliminated) to the exterior through a $\phi$SUB terminal.

In this example, as shown in FIG. 3, the $\phi$ROG pulse is applied to the CCD during the vertical retrace interval, and the $\phi$SUB pulse is applied to the CCD during the horizontal retrace interval. After the $\phi$ROG pulses is applied and the electric charge of the sensor portion 1 is transferred to the vertical transfer register 2 at time $t_0$, the next field interval begins. However, since $\phi$SUB attains the "H" level at every horizontal retrace interval from time $t_0$ to time $t_1$, the electric charge which has accumulated from $t_0$ to $t_1$ does not remain in the sensor portion 1. Since $\phi$SUB is at the "L" level from time $t_1$ to time $t_2$, electric charge is stored in the sensor portion 1 during this time period. This charge is transferred to the vertical transfer register 2 by the "H"-level $\phi$ROG pulse applied at time $t_2$. The end result is that the exposure time of the CCD in this case becomes $(t_2-t_1)$.

Accordingly, though the conventional electronic shutter adequately performs the function of an electronic shutter, problems are encountered when it is applied to correction of exposure. In particular, when exposure time is varied in a continuous manner, a difference in dynamic resolution from one exposure time to another is evident on the picture. As a consequence, the picture that results is highly unattractive since the dynamic resolution changes from one field to the next.

SUMMARY OF THE INVENTION

Accordingly, a principal object of the present invention is to realize control of a solid-state image sensor in which dynamic resolution is fixed.

Another object of the present invention is to realize control of a solid-state image sensor in which an exposure correction suited to the conditions of a photographic subject is possible.

Still another object of the present invention is to realize control of a solid-state image sensor in which dynamic resolution is capable of being improved.

A further object of the present invention is to realize control of a solid-state image sensor in which dynamic resolution varies in a natural manner in a case where exposure is corrected in accordance with the conditions of the subject being photographed.

In order to solve the aforementioned problems and attain the foregoing objects, the present invention provides, in a first aspect thereof, a drive apparatus for a solid-state image sensor having sensing means for for receiving a light signal, performing a photoelectric conversion and storing information, first memory means for reading in the information from the sensing means, second memory means for storing information from the first memory means, and eliminating means for eliminating information from the sensing means, the information in the sensing means being eliminated by the eliminating means intermittently two or more times in one field interval, thereby controlling information storage time, wherein the apparatus has a first driving mode in which, in one field interval, the eliminating means operates at a first periodic timing after a vertical synchronizing signal, and the information from the sensing means is read in the first memory means at a second periodic timing, which has a period identical with that of the first periodic timing, and which lags behind the first periodic timing by a predetermined time $T_1$, and a second driving mode in which, in one field interval, the eliminating means operates at a third periodic timing, which is obtained by frequency-dividing the first periodic timing at a predetermined frequency-dividing ratio, and, at the same time, the information from the sensing means is read in the first memory means at a fourth periodic timing, which is obtained by frequency-dividing the second periodic timing at a frequency-dividing ratio identical with the first-mentioned frequency-dividing ratio, the first driving mode and the second driving mode being selectable.

In accordance with a second aspect of the present invention, there is provided a drive apparatus for a solid-state image sensor having sensing means for receiving a light signal, performing a photoelectric conversion and storing information, first memory means for reading in the information from the sensing means, second memory means for storing information from the first memory means, and eliminating means for eliminating information from the sensing means, the information in the sensing means being eliminated by the eliminating means intermittently two or more times in one field interval, thereby controlling information storage time, wherein, in one field interval, operation of the eliminating means is performed successively each second predetermined time $T_2$ after a first predetermined time $T_1$ from a vertical synchronizing signal, the information from the sensing means is read in the first memory means successively, at every operation of the eliminating means, a third predetermined time $T_3$ after the end of this operation, and the first predetermined time $T_1$, second predetermined time $T_2$ and third predetermined time $T_3$ are controlled so as to vary independently or in association, whereby virtual storage time of the sensing means in one field interval is controlled.

In accordance with a third aspect of the present invention, there is provided a drive apparatus for a solid-state image sensor having sensing means for receiving a light signal, performing a photoelectric conversion and storing information, first memory means for reading in the information from the sensing means, second memory means for storing information from the first memory means, and eliminating means for eliminating information from the sensing means, the information in the sensing means being eliminated by the eliminating means intermittently two or more times in one field interval, thereby controlling information storage time, wherein the apparatus has a first driving mode in which, in one field interval, the information from the sensing means is read in the first memory means, at every one of plural operations of the eliminating means, a predetermined time after the end of each of these operations, and a second driving mode in which, in one field interval, the information from the sensing means is read in the first memory means after completion of all operations of the eliminating means in one field interval, the first driving mode and the second driving mode being selectable or combinable.

In accordance with a fourth aspect of the present invention, there is provided a drive apparatus for a solid-state image sensor having sensing means for receiving a light signal, performing a photoelectric conversion and storing information, first memory means for reading in the information from the sensing means, second memory means for storing information from the first memory means, and eliminating means for eliminating information from the sensing means, the information in the sensing means being eliminated by the eliminating means intermittently in one field interval, thereby controlling overall information storage time, wherein the apparatus has a first driving mode in which, in one field interval, operation of the eliminating means is performed each second predetermined time $t_2$ after a first predetermined time $t_1$ from a vertical synchronizing signal, and the information from the sensing means is read in the first memory means, at every one of a predetermined number n of operations among the operations of the eliminating means, a third predetermined time $t_3$ after the end of each of these operations, and a second driving mode in which, in one field interval, the information from the sensing means is read in the first memory means after completion of all operations of the eliminating means in one field interval, the first predetermined time $t_1$ and predetermined number of times n being gradually changed when the first driving mode and the second driving mode are changed over, with the total storage time being held constant.

Other objects and advantages besides those discussed above shall be apparent to those skilled in the art from the description of a preferred embodiment of the invention will follows. In the description, reference is made to accompanying drawings, which form a part thereof, and which illustrates an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 12 is a timing chart the manner in which a CCD is driven in a second example;

FIG. 13 is a flowchart illustrating the algorithm of an arithmetic circuit in the second embodiment;

FIG. 18 is a timing chart illustrating the operation of the second driving mode in a third embodiment;

DESCRIPTION OF THE PREFERRED EMBODIMENTS

Several preferred embodiments for a case where the present invention is applied to a video camera will be described in detail with reference to the accompanying drawings.

Prior to describing each of the embodiments in detail, a solid-state image sensor (CCD) used commonly in each of these embodiments will be discussed.

Figure 3:
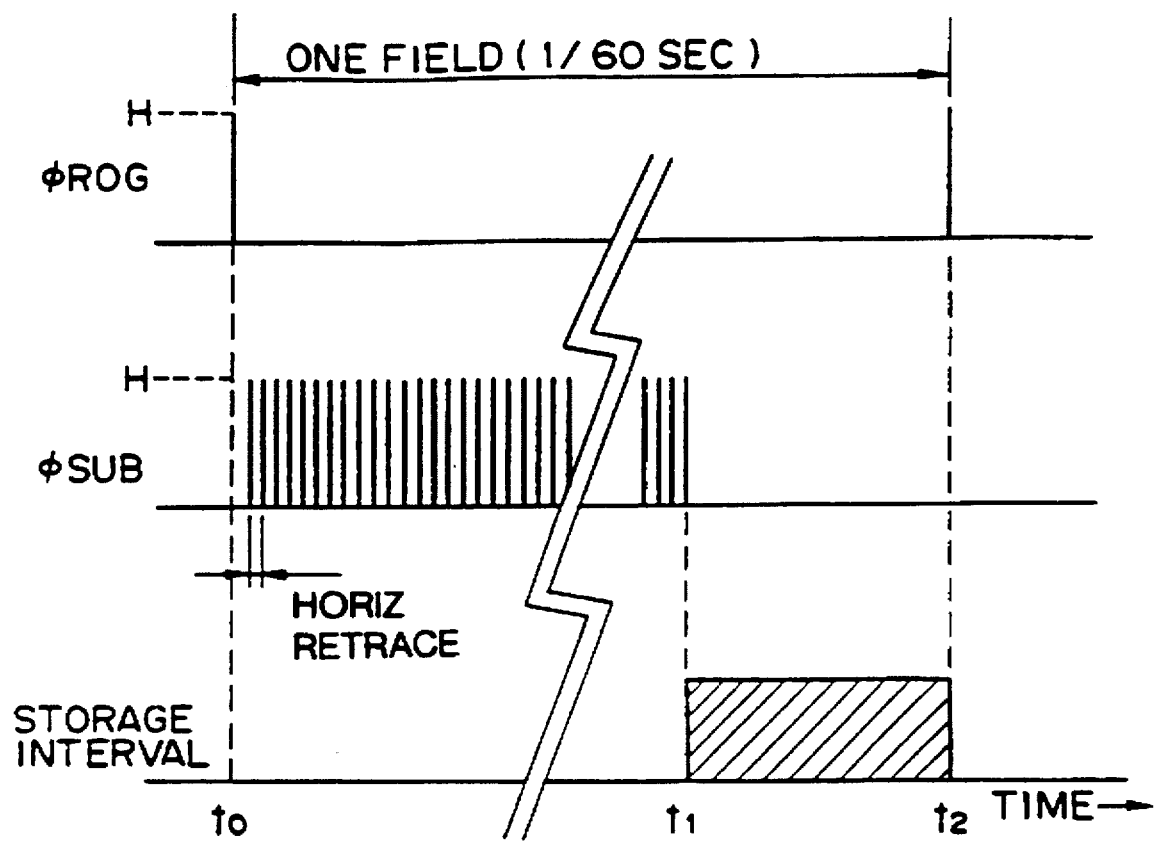
FIG. 3 is a timing chart showing various signals in one field interval of a standard television signal.
Figure 4:
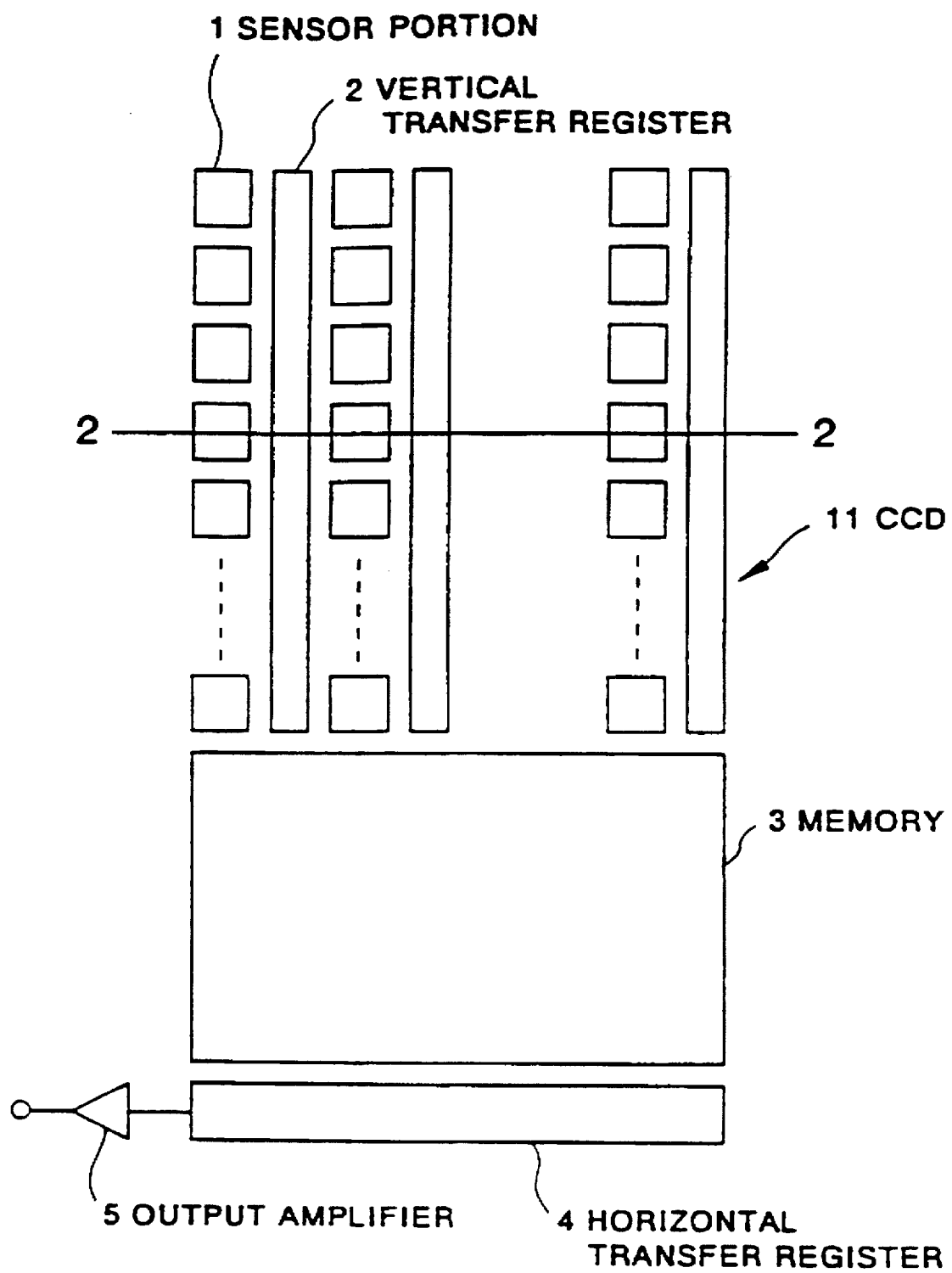
FIG. 4 is a plan view schematically illustrating the structure of a frame interline transfer-type CCD.

FIG. 4 is a plan view schematically illustrating the structure of a CCD 11 used in each embodiment. The CCD 11 is referred to as a frame interline transfer-type CCD. This differs from the interline transfer-type CCD of FIG. 3 in that a memory 3 (second memory means) is provided. The number of memory cells in the memory 3 is the same as the number of sensor portions 1 (sensing means).

When light strikes the sensor portion 1, an electric charge is generated and accumulates within the sensor portion. The accumulated charge is transferred to the vertical transfer register 2 (first memory means), after which it is transferred to the memory 3 in the vertical retrace interval. Thereafter, the charge is transferred to the horizontal transfer register 4, whence it is read out through the output amplifier 5.

Figure 2:
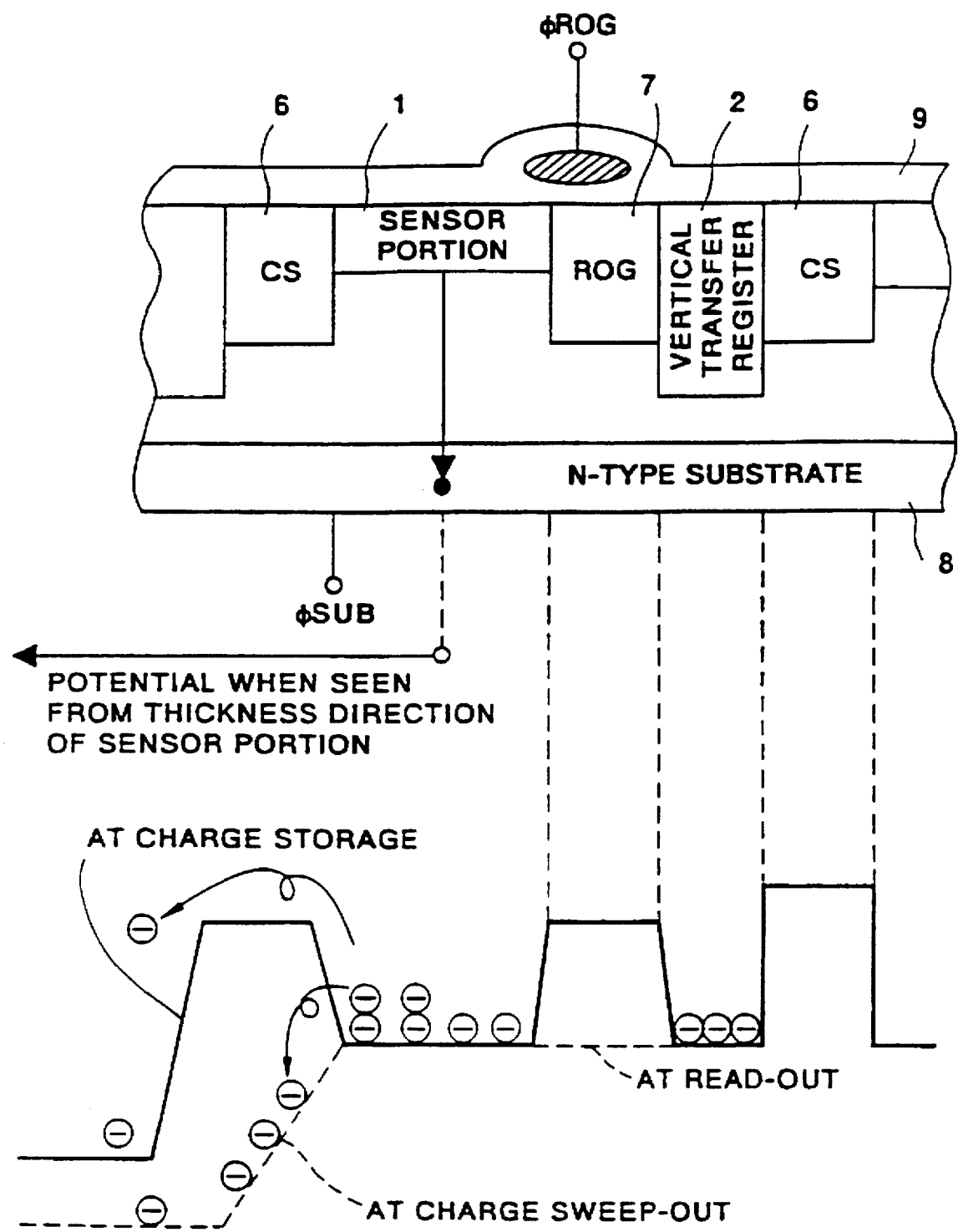
FIG. 2 is a sectional view taken along line A–A' of the CCD of FIG. 1 and a diagram illustrating the states of potentials at various portions corresponding to this cross section.

The sectional view taken along line A–A' of the CCD 11 of FIG. 4 and a diagram illustrating the states of potentials at various portions corresponding to this cross section are similar to those of FIG. 2. In addition, the procedure for sweeping out the electric charge and the procedure for transferring the electric charge from the sensor portion 1 to the vertical transfer register 2 are similar to those of the prior art described earlier.

Each of the embodiments of the invention will now be described in detail.

(First Embodiment)

Figure 5:
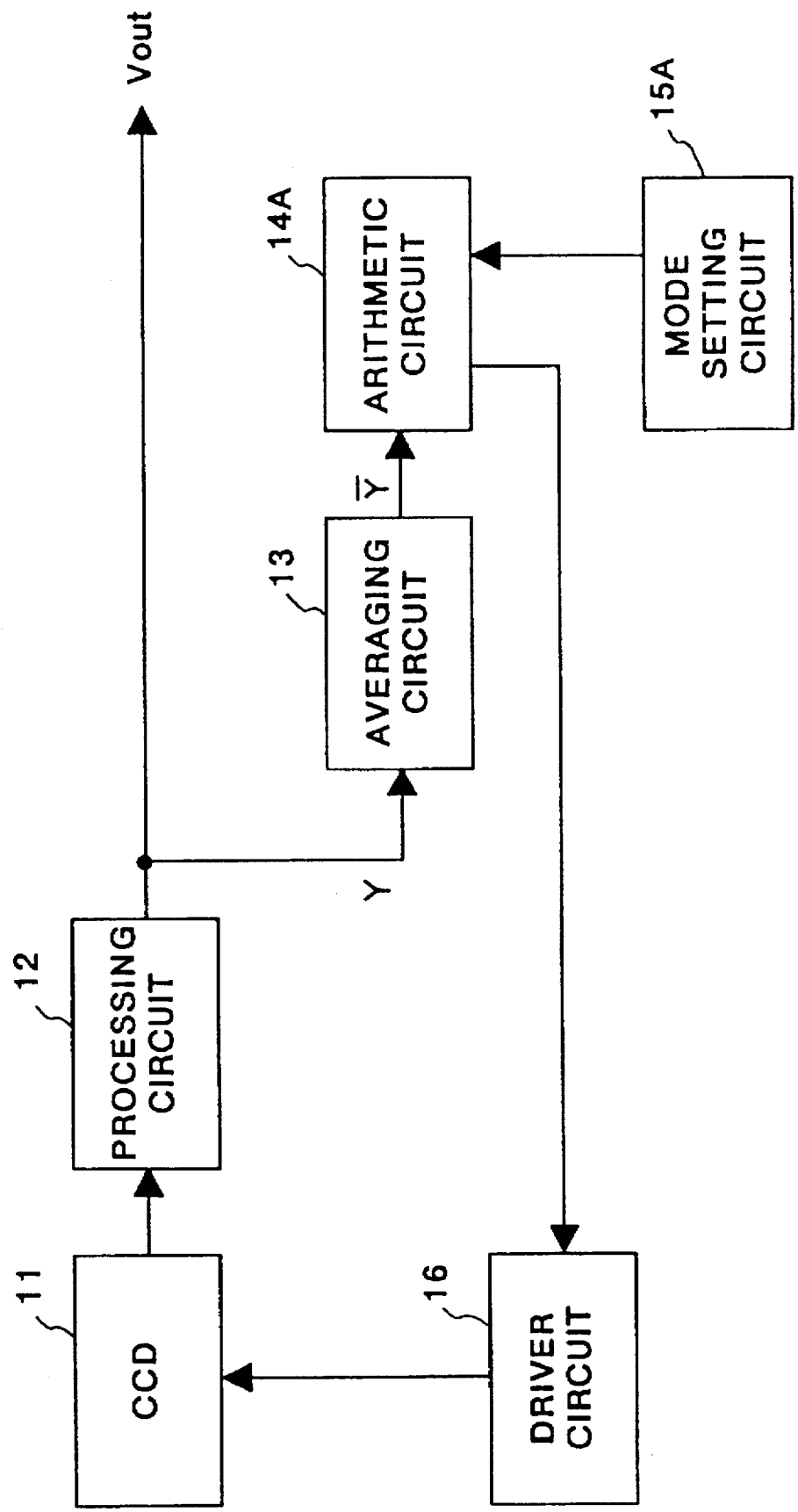
FIG. 5 is a block diagram illustrating the construction of the principal portions of a video camera to which a first embodiment is applied.

FIG. 5 is a block diagram illustrating the construction of the principal components of a video camera according to the first embodiment. The output signal extracted from the CCD 11 undergoes corrections such as a γ correction, knee correction and automatic-gain correction in a processing circuit 12, and the corrected signal is encoded and outputted as a video signal Vout. Meanwhile, a luminance signal Y in the signal outputted from the processing circuit 12 is converted into a $\bar{Y}$ signal by an averaging circuit 13, and the resulting $\bar{Y}$ signal is applied to an arithmetic circuit 14A, where the signal is processed. The arithmetic circuit 14A computes the drive timing of the CCD 11 from the output signal produced by the averaging circuit 13 and an output signal produced by a mode setting circuit 15A, described below. A driver circuit 16, which is controlled in accordance with the drive timing computed, drives the CCD 11 under the control of the arithmetic circuit 14A.

The mode setting circuit 15A, which has a plurality of modes conforming to the conditions of the subject being photographed, performs a changeover operation so as to select any one of these modes. In this embodiment, the plurality of modes shall be two, by way of example. Though they will be described in greater detail later, one mode is a first driving mode suitable for a fast-moving subject, and the other is a second driving mode suited to a slow-moving subject. Upon receiving a selection signal from the mode setting circuit 15A, the arithmetic circuit 14A sets the drive timing of the CCD 11. The driver circuit 16 drives the CCD 11 in accordance with the timing set by the arithmetic circuit 14A.

Figure 6:
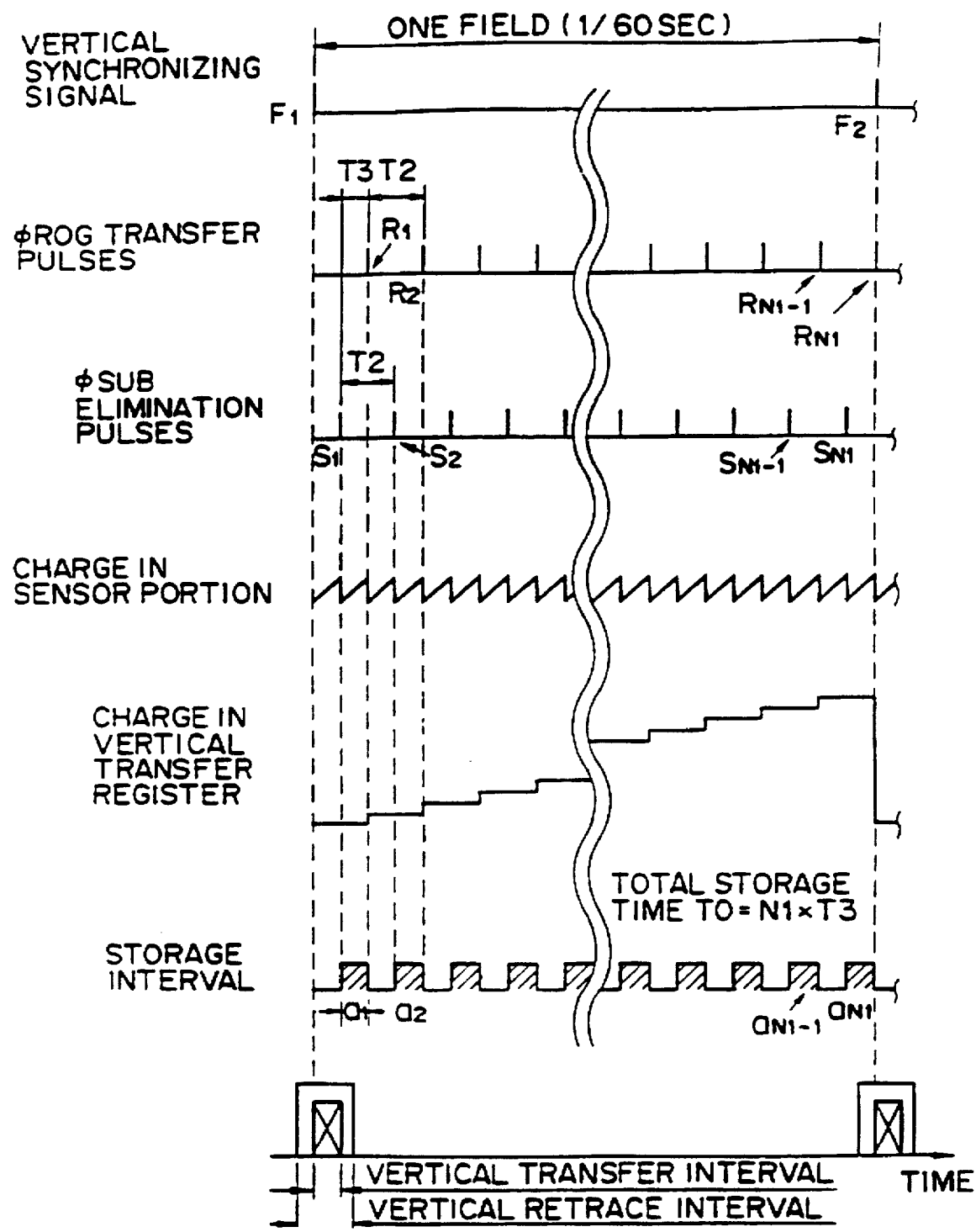
FIG. 6 is a timing chart illustrating the operation of a first driving mode in the first embodiment.
Figure 7:
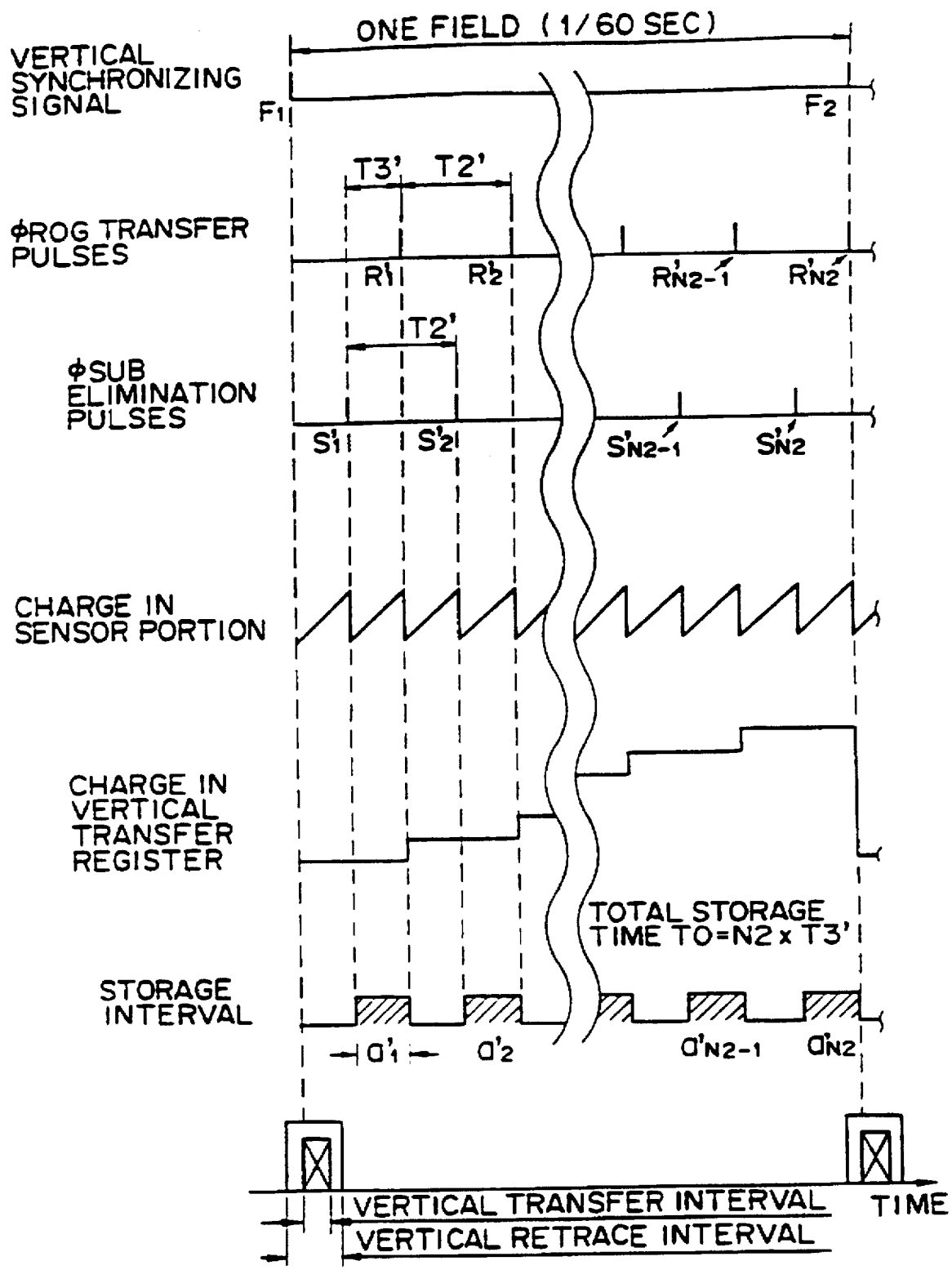
FIG. 7 is a timing chart illustrating the operation of a second driving mode in the first embodiment.

FIG. 6 is a diagram for describing the operation of the first embodiment and illustrates the manner of drive in a case where an exposure correction is performed by the CCD 11 (FIG. 4) itself. FIG. 6 illustrates the first driving mode, and FIG. 7 illustrates the second driving mode.

As shown in FIG. 6, in response to application of a φROG transfer pulse to the CCD 11 at time $F_1$, the electric charge accumulated in the sensor portion 1 up to the instant just prior to application of the aforementioned pulse is transferred from the sensor portion 1 to the vertical transfer register 2. One field interval of the charge is delivered from the vertical transfer register 2 to the memory 3 at a high speed in the vertical retrace interval (the interval during which the delivery of the charge is made is referred to as a "vertical transfer interval" in FIG. 6). Thereafter, at a first periodic timing (period $T_2$) after the vertical synchronizing signal, φSUB elimination pulses $S_1, S_2, \ldots, SN_1$ are applied to the CCD 11. Further, φROG transfer pulses $R_1, R_2, \ldots, R_{N1}$ are applied to the CCD 11 at a second periodic timing the period of which is identical to that of the first periodic timing. As a result, sweep-out (elimination) and storage of the charge are performed in an alternating manner.

Here the φSUB elimination pulses $S_1, S_2, \ldots, S_{N1}$ and φROG transfer pulses $R_1, R_2, \ldots, R_{N1}$ are applied to the CCD 11 in, or in the proximity of, the horizontal retrace interval of a standard television signal. The reason for this is that noise would appear in the picture if the φSUB elimination pulses and φROG transfer pulses were applied at a time other than that mentioned.

Furthermore, the φROG transfer pulses $R_1, R_2, \ldots, R_{N1}$ are applied following a delay of time $T_3$ with respect to the φSUB elimination pulses $S_1, S_2, \ldots, S_{N1}$. Accordingly, intervals $a_1, a_2, \ldots, a_{N1-1}, a_{N1}$ corresponding to the time difference between the φSUB elimination pulses and φROG transfer pulses are the actual charge storage intervals, and thus storage of the charge is performed in a dispersed fashion over several intervals.

The charge is moved from the sensor portion 1 to the vertical transfer register 2 by the φROG transfer pulses $R_1, R_2, \ldots, R_{N1}$. Accordingly, the total sum of the charge (the charge produced during the total storage time $T_0=N_1 \times T_3$) produced in the sensor portion 1 during the fine storage intervals $a_1, a_2, \ldots, a_{N1}$ is stored in each of the cells of the vertical transfer register 2 immediately after the end of the interval during which the φROG transfer pulse $R_{N1}$ is at the "H" level. In other words, by changing the application timing and the number of the φSUB elimination pulses in one field interval, the total sum of the electric charge stored in the vertical transfer register is controlled and the CCD 11 itself functions as a shutter.

Thus, by distributing the storage intervals evenly throughout one entire field interval, the time from the start to the end of acceptance of one frame of image information is rendered constant, and therefore so is the dynamic resolution.

In FIG. 7, on the other hand, the application timings of the φSUB elimination pulses $S_1', S_2', \ldots, S_{N2}'$ and the application timings of the φROG transfer pulses $R_1', R_2', \ldots, R_{N2}'$ are obtained by frequency-dividing, by two, the respective application timings of the φSUB elimination pulses and the application timings of the φROG transfer pulses shown in FIG. 6 (i.e., period $T_2'=2T_2$).

In comparison with FIG. 6, the numbers of the φSUB elimination pulses and φROG transfer pulses are halved ($N_2=N_1/2$), and the time difference $T_3'$ between the φSUB elimination pulses and φROG transfer pulses is twice the time difference $T_3$. Accordingly, the lengths of storage times $a_1', a_2', \ldots, a_{N2}'$ are doubled, and the total storage time $T_0=N_2 \times T_3'$ in one field interval is the same as in the case of FIG. 6.

Accordingly, if the application timings of the φSUB elimination pulses and φROG transfer pulses are changed by frequency division, it is possible to finely or coarsely distribute the storage times while keeping the total storage time in one field interval identical.

The use of the first driving mode, in which storage times are finely distributed, and of the second driving mode, in which storage times are coarsely distributed, will now be described.

First, the difference between these two driving modes in terms of the blooming phenomenon will be described.

In a case where strong light is incident upon a portion of a scene to be photographed, the amount of the electric charge exceeds the storage capacity of the sensor 1 at the portion where the strong light has impinged, and the charge overflows as a result. When such charge overflow occurs, the charge which has overflowed from the sensor portion 1 flows into the signal transfer portion and so-called blooming results. This is a phenomenon in which vertical white bands appear on the picture, thereby producing a picture which is very unattractive.

The longer the continuous charging time in one field interval, the more easily the charge overflow occurs, since the charge which accumulates in the sensor portion 1 in such case grows in quantity. Conversely, if the charging time in one field interval is finely, divided and the charge in the sensor portion 1 is delivered to the vertical transfer register 2 in small amounts, blooming occurs less easily. In other words, when charging time is finely split up as in the first driving mode shown in FIG. 6, blooming is less likely to occur in comparison with the coarse division of charging time of the second driving mode shown in FIG. 7.

Next, the difference between the two driving modes in terms of the moving speed of the subject will be discussed.

First, in a case where the first driving mode is applied to a subject moving at a comparatively low speed, the picture which results is one in which a plurality of images overlap one another because the time intervals between neighboring ones of the fine charging intervals is short. This produces an unattractive picture. By contrast, when the second driving mode is applied to a slow-moving subject, the time intervals between neighboring ones of the fine charging intervals is long, and therefore stroboscopic discontinuous images are obtained. The result is a picture with comparatively little unnaturalness.

Accordingly, in a situation where, for example, the subject is fast-moving and there is a strong spotlight in the scene, the first driving mode should be selected. On the other hand, if the subject is slow-moving and there is not a very strong spotlight in the scene, the second driving mode should be selected. By thus making appropriate use of the two driving modes, it is possible to perform exposure control that is suited to the conditions of the subject.

Thus, in accordance with the first embodiment set forth above, dispersed storage of electric charge is carried out in one field interval so that dynamic resolution can be held constant. Furthermore, in order to obtain the same overall storage interval, modes in which the dispersed storage of charge is performed finely and coarsely are selected in conformity with the conditions of the subject. Thus exposure control in accordance with conditions of the subject is possible.

(Second Embodiment)

In the first embodiment, two modes for finely and coarsely dispersing storage of charge in one field interval are provided, and therefore exposure control conforming to the conditions of the subject is achieved. However, in the first embodiment, the storage times are evenly distributed over the interval from the beginning to the end of one field interval. As a consequence, a time difference approximating 1/60 of a second develops between the electric charge produced at the sensor portion 1 in the initial storage interval of one field interval and the electric charge produced at the sensor portion 1 in the final storage interval of one field interval. Accordingly, though the dynamic resolution can be rendered constant in the first embodiment, the images can take on a strobe-like effect or overlap when a moving subject is photographed, and the disadvantageous result is a decline in the dynamic resolution. The second embodiment is intended to solve these problems.

Figure 8:
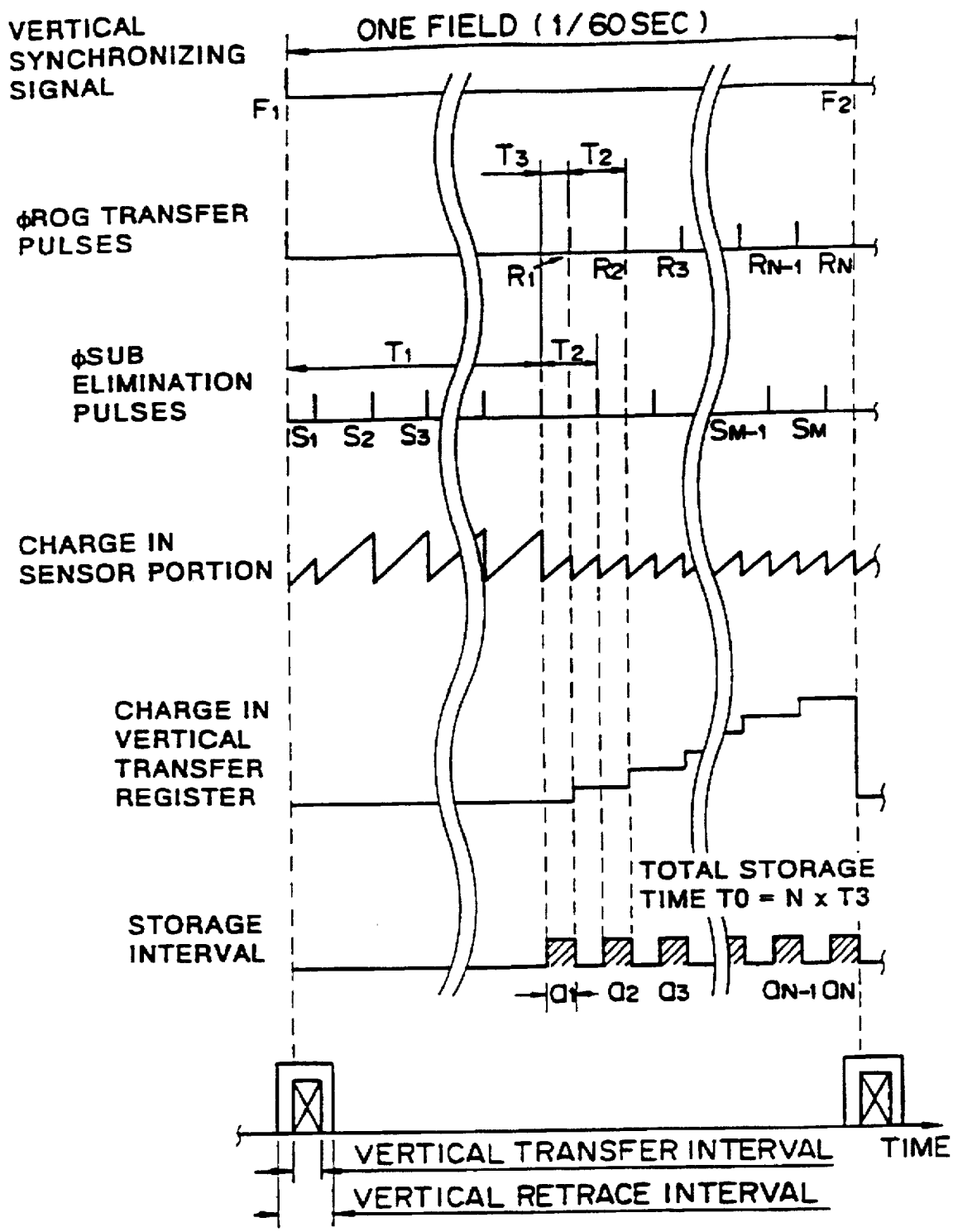
FIG. 8 is a timing chart illustrating the operation of a second embodiment.

FIG. 8 is a diagram for describing the general operation of the second embodiment and illustrates the manner in which the CCD 11 is driven in a case where exposure is corrected by the CCD 11 of FIG. 4 itself.

As shown in FIG. 8, in response to application of a $\phi$ROG transfer pulse to the CCD 11 at time $F_1$, the electric charge accumulated in the sensor portion 1 up to the instant just prior to application of the aforementioned pulse is transferred from the sensor portion 1 to the vertical transfer register 2. One field interval of the charge is delivered from the vertical transfer register 2 to the memory 3 at a high speed in the vertical retrace interval (the interval during which the delivery of the charge is made is referred to as a "vertical transfer interval" in FIG. 8). Thereafter, at the intervals of a second predetermined time $T_2$, $\phi$SUB elimination pulses are applied to the CCD 11 M times in one field interval, as indicated by $S_1, S_2, \ldots, S_M$. The charge that has accumulated in the sensor portion 1 is swept out (eliminated) whenever a $\phi$SUB elimination pulse is generated.

Further, $\phi$ROG transfer pulses are applied to the CCD 11 at the intervals of the second predetermined time $T_2$, which is identical with that of the $\phi$SUB elimination pulses, in the course of one field interval following the point in time $F_1$, as indicated by $R_1, R_2, \ldots, R_N$. It is arranged so that the $\phi$SUB elimination pulse immediately preceding the initial pulse $R_1$ is applied after a delay of a first predetermined time $T_1$ from the point in time $F_1$. A third predetermined time $T_3$, which is the time difference between the $\phi$SUB elimination pulses and the $\phi$ROG transfer pulses, is equivalent to each of the actual storage intervals $a_1, a_2, \ldots, a_N$ of the sensor.

In other words, the charge stored in the sensor portion 1 in the N-number of fine storage intervals $a_1, a_2, \ldots, a_N$ in one field interval is successively transferred to the vertical transfer register 2 by the $\phi$ROG transfer pulses $R_1, R_2, \ldots, R_N$ and is stored in each cell of the vertical transfer register 2.

Accordingly, the total sum of the charge (charge stored in the overall storage time $T_0 = N \times T_3$) produced in the sensor portion 1 in N-number of fine storage intervals each having the length of time $T_3$ in one field interval is added up in the vertical transfer register 2 and mixed, after which the charge is transferred vertically one time at high speed and stored in the memory 3.

As in the first embodiment, the $\phi$SUB elimination pulses $S_1, S_2, \ldots, S_M$ and $\phi$ROG transfer pulses $R_1, R_2, \ldots, R_N$ are each applied to the CCD 11 in, or in the proximity of, the horizontal retrace interval of a standard television signal. The reason for this is that noise would appear in the picture if the $\phi$SUB elimination pulses or $\phi$ROG transfer pulses were applied at a time other than that mentioned.

Figure 1:
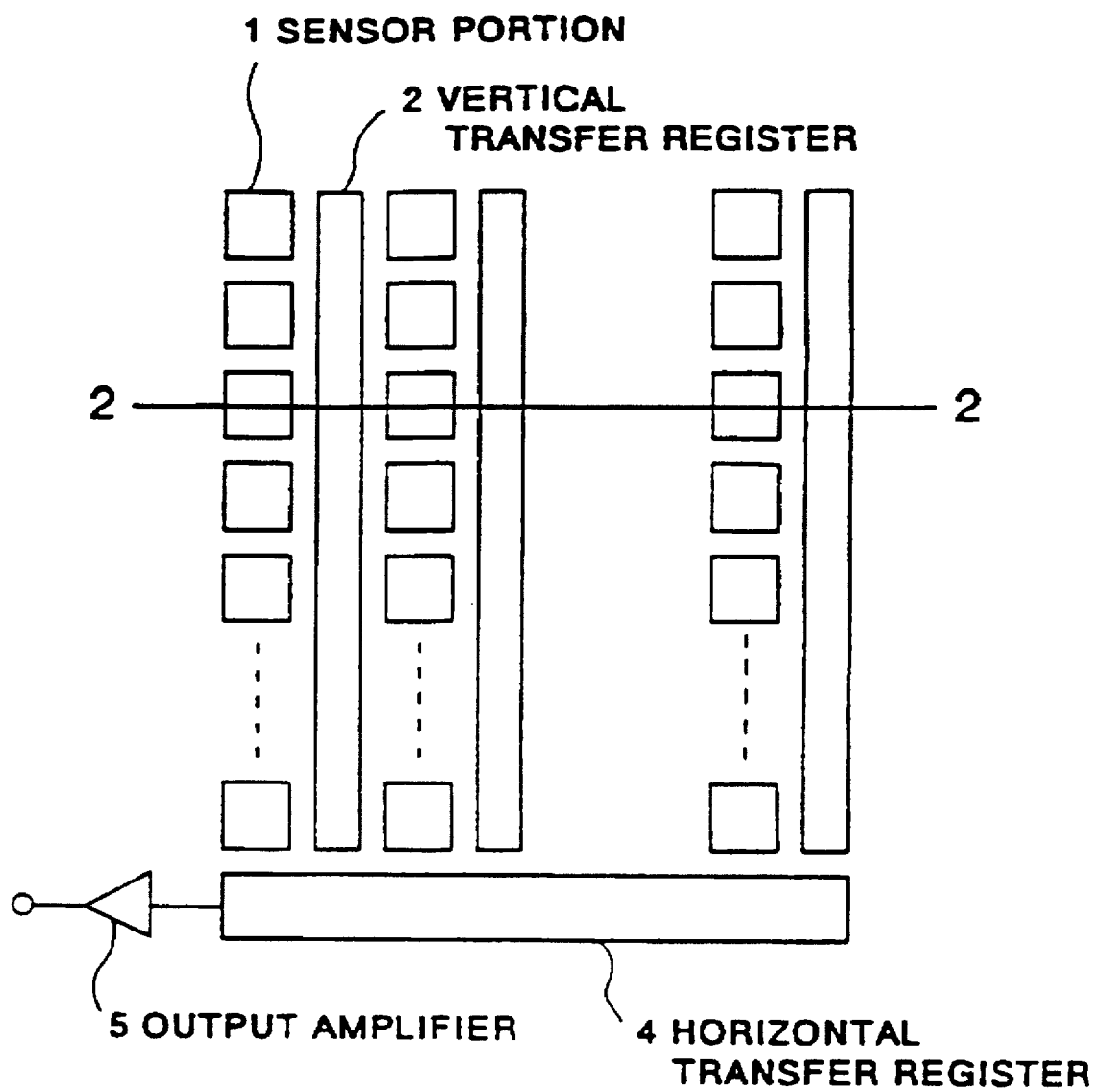
FIG. 1 is a plan view schematically illustrating the structure of an interline transfer-type CCD.

The charge stored in the memory 3 is subsequently transferred to the horizontal transfer register 4 and extracted as an output signal through the output amplifier 5. This process is similar to that of the interline transfer-type CCD of FIG. 1.

Figure 9:
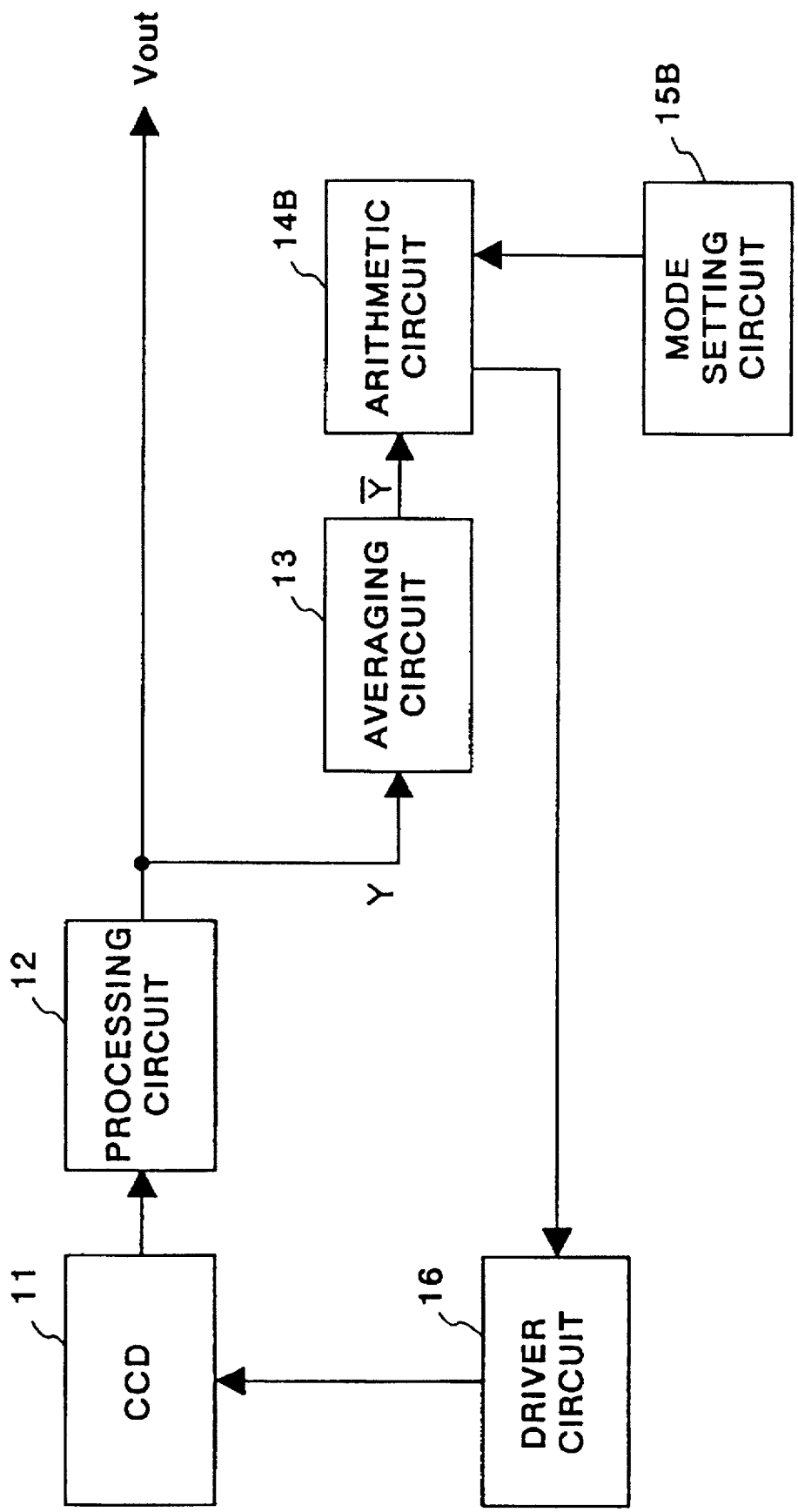
FIG. 9 is a block diagram illustrating the construction of the principal portions of a video camera to which the second embodiment is applied.

FIG. 9 is a block diagram illustrating the construction of the principal components of a video camera according to the first embodiment. The output signal extracted from the CCD 11 undergoes corrections such as a $\gamma$ correction, knee correction and automatic-gain correction in the processing circuit 12, and the corrected signal is encoded and outputted as the video signal Vout. Meanwhile, a luminance signal Y in the signal outputted from the processing circuit 12 is converted into a $\overline{Y}$ signal by the averaging circuit 13, and the resulting $\overline{Y}$ signal is applied to an arithmetic circuit 14B, where the signal is processed. The arithmetic circuit 14B computes the drive timings of the CCD 11, namely $T_1$, $T_2$, $T_3$, from the output signal produced by the averaging circuit 13 and an output signal produced by a mode setting circuit 15B, described below. A driver circuit 16, which is controlled in accordance with the drive timings computed, drives the CCD 11 under the control of the arithmetic circuit 14B.

The mode setting circuit 15B, which has a plurality of modes conforming to the conditions of the subject being photographed, performs a changeover operation so as to select any one of these modes. In this embodiment, the plurality of modes shall be two, namely a dynamic mode suitable for a fast-moving subject, and a static mode suited to a slow-moving subject. Upon receiving a selection signal from the mode setting circuit 15B, the arithmetic circuit 14B sets the values of $T_1$, $T_2$, $T_3$. The driver circuit 16 drives the CCD 11 in accordance with the set values of $T_1$, $T_2$, $T_3$ set by the arithmetic circuit 14B.

Methods of changing $T_1$, $T_2$, $T_3$ in conformity with the condition of the subject will now be described. <First Example >

Discussed first will be a first example of a method of changing $T_1$, $T_2$, $T_3$ in accordance with the condition of the subject.

Figure 10:
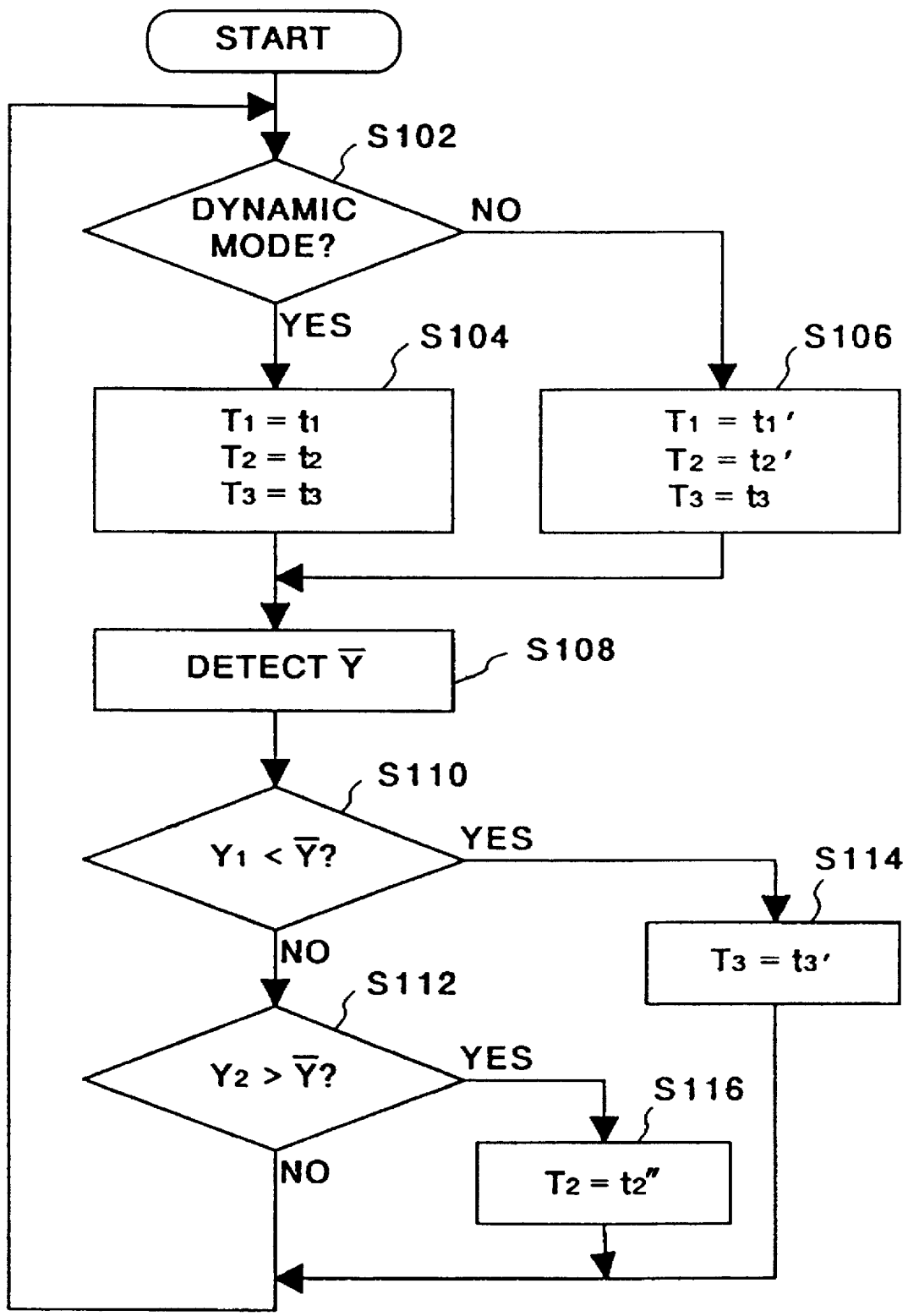
FIG. 10 is a flowchart illustrating the algorithm of an arithmetic circuit in the first embodiment.

FIG. 10 is a flowchart illustrating the algorithm of the arithmetic circuit 14B according to the first example. Step S102 of the flowchart calls for the arithmetic circuit 14B to determine whether the mode is the dynamic mode or static mode, based upon the output signal from the mode setting circuit 15B. If the decision rendered at step S102 is that the dynamic mode is in effect, the program proceeds to step S104, at which point the arithmetic circuit 14B sets $T_1$, $T_2$, $T_3$ to $t_1$, $t_2$, $t_3$, respectively. This is followed by step S108. If the decision rendered at step S102 is that the static mode is in effect, the program proceeds to step S106, at which the arithmetic circuit 14B sets $T_1$, $T_2$, $T_3$ to $t_1'$, $t_2'$, $t_3'$, respectively. This is followed by step S108. It should be noted that $t_1$, $t_1'$, $t_2$, $t_2'$ are fixed values, and that the relations $t_1 < t_1'$, $t_2 < t_2'$ hold.

The reason for setting $T_1$ to a large value in the dynamic mode is that the image would blur as in the manner of the strobe effect if $T_1$ were set to a small value with respect to a fast-moving subject. In other words, $T_1$ is set large to shorten the time from the start of charge storage to the end of charge storage of the sensor portion 1 in one field interval, thereby reducing blurring.

Next, at step S108, the arithmetic unit 14B senses the magnitude of the averaged luminance signal $\overline{Y}$ from the averaging circuit 13, after which the program proceeds to step S110. Here the level of the averaged luminance signal $\overline{Y}$ is compared with a reference value $Y_1$. If the level of the averaged luminance signal $\overline{Y}$ is found to be greater than $Y_1$ at step S110, namely if the subject is bright, then the arithmetic circuit 14B sets $T_3$ to $t_3'$ ($t_3' < t_3$). On the other hand, if the level of the averaged luminance signal $\overline{Y}$ is found to be equal to or less than $Y_1$ at step S110, namely if the subject is of ordinary brightness or is dark, then the program proceeds to step S112.

The level of the averaged luminance signal $\overline{Y}$ is compared with a reference value $Y_2$ at step S112. If the level of the averaged luminance signal $\overline{Y}$ is found to be less than $Y_2$ ($Y_2 > \overline{Y}$) at step S112, namely if the subject is very dark, then the arithmetic circuit 14B sets $T_2$ to $t_2''$ (where $t_2'' = t_2/2$), thereby doubling the total storage time.

If the level of the averaged luminance signal $\overline{Y}$ is found to be equal to or greater than the reference value $Y_2$ at step S112, namely if the subject is of ordinary brightness, then $T_1$, $T_2$, $T_3$ remain at the values set, at step S104 or S106. Processing then returns to the beginning of the program and the foregoing operation is repeated for every field.

Figure 11:
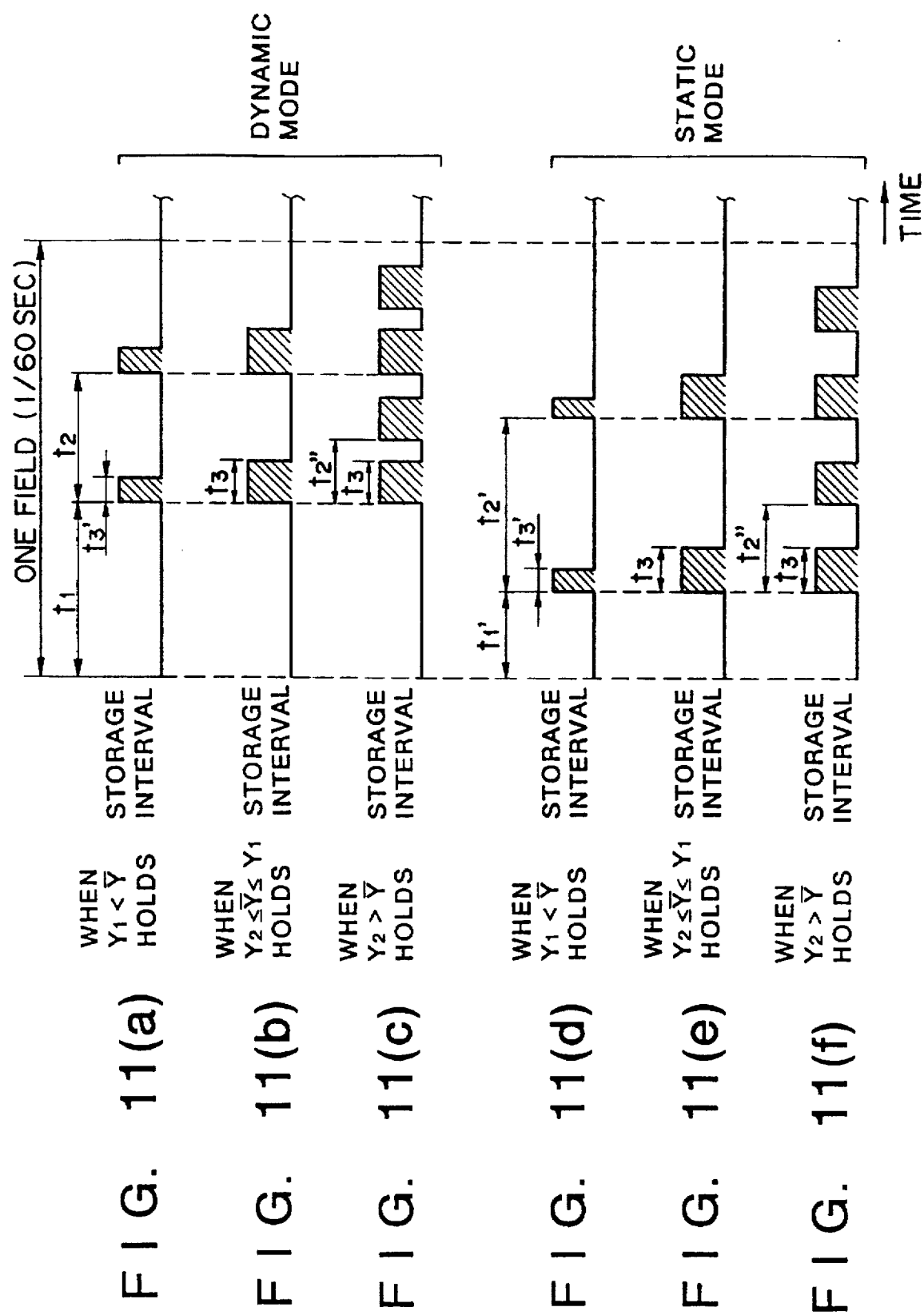
FIG. 11($a$–$f$) is a timing chart in which times $T_1, T_2, T_3$ set by the arithmetic circuit are illustrated in each mode of the first embodiment.

FIG. 11 is a timing chart in which $T_1$, $T_2$, $T_3$ set by the arithmetic circuit 14B are illustrated for each mode. The dynamic mode will be described first. FIG. 11(a) is for the case where $Y_1 < \overline{Y}$ holds, namely for when the subject is bright. $T_1$, $T_2$, $T_3$ are initially set to $t_1$, $t_2$, respectively, and then the storage time $T_3$ is set small ($t_3'$).

FIG. 11(b) is for the case where $Y_2 \leq \overline{Y}$ holds, namely for when the subject is of ordinary brightness. $T_1$, $T_2$, $T_3$ are left set at the values initially set in the flowchart of FIG. 10, i.e., $T_1 = t_1$, $T_2 = t_2$, $T_3 = t_3$.

FIG. 11(c) is for the case where $Y_2 > \overline{Y}$ holds, namely for when the subject is dark. $T_1$, $T_2$, $T_3$ are set at $t_1$, $t_2''$, $t_3$, respectively, and the storage inverter $T_2$ is set small.

In the static mode, the initial settings at step S106 are the same as in the dynamic mode except for settings $T_1 = t_1'$, $T_2 = t_2'$, $T_3 = t_3$. Accordingly, the settings made are $T_1 = t_1'$, $T_2 = t_2'$, $T_3 = t_3$ in the case $Y_1 < \overline{Y}$ shown in FIG. 11 (d); $T_1 = t_1'$, $T_2 = t_2'$, $T_3 = t_3$ in the case $Y_2 \leq \overline{Y} < Y_1$ shown in FIG. 11 (e); and $T_1 = t_1'$, $T_2 = t_2''$, $T_3 = t_3$ in the case $Y_2 > \overline{Y}$ shown in FIG. 11(f).

When the time interval $T_2$ of the $\phi$ROG transfer pulses and $\phi$SUB elimination pulses is changed, it will suffice to arrange to so that the application timings of the $\phi$ROG transfer pulses and $\phi$SUB elimination pulses serving as a reference are each varied by frequency division, as in the manner of the first embodiment, for example.

In the first example described above, the total storage time in one field can be controlled by changing, independently or in combination, the first predetermined time $T_1$ up to the beginning of the initial storage operation in one field, the second predetermined time $T_2$ serving as the fine storage interval, and the predetermined time $T_3$ serving as the fine storage time. More specifically, $T_1$, $T_2$ and $T_3$ can be used upon being changed depending on the brightness of the subject, its condition and environment. In other words, the modes can be used appropriately in accordance with the subject, as described above, even if the exposure time of the CCD 11 is made the same.

In particular, enlarging $T_1$ shortens the time from the start to the end of storage in one field interval. As a result, an electronic shutter function can be achieved in which dynamic resolution neither deteriorates, even for a fast-moving subject, nor varies depending upon the scene.
<Second Example>

Next, a second example of a method of changing $T_1$, $T_2$, $T_3$ in accordance with the condition of the subject will be described.

FIG. 12 is a timing chart illustrating the manner in which the CCD 11 is driven in the second method. In this example, the interval at which the $\phi$ROG transfer pulses are applied in the timing chart of FIG. 8 is changed from $T_2$ to $K_j T_2$ (where $K_j$ is a positive integer), which is a whole-number multiple of $T_2$. More specifically, a change is made from a state in which an $\phi$ROG transfer pulse is applied after one $\phi$SUB elimination pulse is applied, to a state in which an $\phi$ROG transfer pulse is applied after several $\phi$SUB elimination pulses are applied.

As shown in FIG. 12, in response to application of a $\phi$ROG transfer pulse to the CCD 11 at time $F_1$, the electric charge accumulated in the sensor portion 1 up to the instant just prior to application of the aforementioned pulse is transferred from the sensor portion 1 to the vertical transfer register 2. One field interval of the charge is delivered from the vertical transfer register 2 to the memory 3 at a high speed in the vertical retrace interval (the interval during which the delivery of the charge is made is referred to as a "vertical transfer interval" in FIG. 12). Thereafter, at the intervals of a second predetermined time $T_2$, φSUB elimination pulses are applied to the CCD 11 M times in one field interval, as indicated by $S_1, S_2, \ldots, S_M$. The charge that has accumulated in the sensor portion 1 is swept out (eliminated) whenever a φSUB elimination pulse is generated.

Further, φROG transfer pulses are applied to the CCD 11 at time intervals $K_1 \times T_2, K_2 \times T_2, \ldots, K_{N-1} \times T_2$ (where $K_1, K_2, \ldots, K_{N-1}$ are positive integers) in the course of one field interval following the point in time $F_1$, as indicated by $R_1, R_2, \ldots, R_N$, respectively. The φSUB elimination pulse immediately preceding the initial pulse $R_1$ is applied after a delay of a first predetermined time $T_1$ from the point in time $F_1$, as illustrated. A third predetermined time $T_3$, which is the time difference between the φSUB elimination pulses and the φROG transfer pulses, is equivalent to each of the actual storage intervals $a_1, a_2, \ldots, a_N$ of the sensor.

In other words, the charge stored in the sensor portion 1 in the N-number of fine storage intervals $a_1, a_2, \ldots, a_N$ in one field interval is successively transferred to the vertical transfer register 2 by the φROG transfer pulses $R_1, R_2, \ldots, R_N$ and is stored in each cell of the vertical transfer register 2.

Accordingly, the total sum of the charge (charge stored in the overall storage time $T_0 = N \times T_3$) produced in the sensor portion 1 in N-number of fine storage intervals each having the length of time $T_3$ in one field interval is added up in the vertical transfer register 2 and mixed, after which the charge is transferred vertically one time at high speed and stored in the memory 3.

The application timings of the φSUB elimination pulses $S_1, S_2, \ldots, S_M$ and φROG transfer pulses $R_1, R_2, \ldots, R_N$ are set in, or in the proximity of, the horizontal retrace interval of a standard television signal. The reason for this is that noise would appear in the picture if the φSUB elimination pulses or φROG transfer pulses were applied at a time other than that mentioned.

The charge stored in the memory 3 is subsequently transferred to the horizontal transfer register 4 and extracted as an output signal through the output amplifier 5. This process is similar to that of the interline transfer-type CCD of FIG. 1.

FIG. 13 is a flowchart illustrating the algorithm of the arithmetic circuit 14B according to the second example (the first and second examples differ only in terms of the algorithms of the arithmetic circuit 14B).

Step S202 of the flowchart calls for the arithmetic circuit 14B to determine whether the mode is the dynamic mode or static mode, based upon the output signal from the mode setting circuit 15B. If the decision rendered at step S202 is that the dynamic mode is in effect, the program proceeds to step S204, at which point the arithmetic circuit 14B sets $T_1$, $T_2$, $T_3$, $K_j$ to $t_1$, $t_2$, $t_3$, $k_j$, respectively (where $k_j$ is a positive integer). This is followed by step S206.

Next, at step S206, the arithmetic unit 14B senses the magnitude of the averaged luminance signal $\overline{Y}$ from the averaging circuit 13, after which the program proceeds to step S208. Here the averaged luminance signal $\overline{Y}$ is compared with the reference signal $Y_1$.

If the level of the averaged luminance signal $\overline{Y}$ is found to be greater than $Y_1$ at step S208, namely if the subject is bright, then the arithmetic circuit 14B sets $K_j$ to $k_j'$ ($k_j < k_j'$). On the other hand, if the level of the averaged luminance signal $\overline{Y}$ is found to be equal to or less than $Y_1$ at step S208, namely if the subject is of ordinary brightness or is dark, then the program proceeds to step S210.

The level of the averaged luminance signal $\overline{Y}$ is compared with a reference value $Y_2$ at step S210. If the level of the averaged luminance signal $\overline{Y}$ is found to be less than $Y_2$ ($Y_2 > \overline{Y}$) at step S210, namely if the subject is dark, then the arithmetic circuit 14B sets $K_j$ to $k_j''$ ($k_j > k_j''$).

If the level of the averaged luminance signal $\overline{Y}$ is found to be equal to or greater than the reference value $Y_2$ at step S210, namely if the subject is of ordinary brightness, then $T_1, T_2, T_3$ remain at the values set at step S204. Processing then returns to the beginning of the program.

If the decision rendered at step S202 is that the static mode is in effect, the program proceeds to step S216, at which the arithmetic circuit 14B sets $T_1, T_2, T_3, K_j$ to $t_1', t_2, t_3, i_j$, respectively (where $i_j$ is a positive integer). This is followed by step S218. It should be noted that $t_1' < t_1$, $k_k < i_j$.

The reason for setting $T_1$ to be larger in the dynamic mode than in the static mode is as follows: Since the image would blur as in the manner of the strobe effect if $T_1$ were set to a small value with respect to a fast-moving subject, $T_1$ is set large to shorten the time from the start of charge storage to the end of charge storage of the sensor portion 1 in one field interval, thereby reducing blurring.

Next, at step S218, the arithmetic unit 14B senses the magnitude of the averaged luminance signal $\overline{Y}$ from the averaging circuit 13, after which the program proceeds to step S220. Here the level of the averaged luminance signal $\overline{Y}$ is compared with the reference value $Y_1$.

If the level of the averaged luminance signal $\overline{Y}$ is found to be greater than $Y_1$ at step S220, namely if the subject is bright, then the program proceeds to step S220 and the arithmetic circuit 14B sets $K_j$ to $i_j'$ ($i_j < i_j'$). On the other hand, if the level of the averaged luminance signal $\overline{Y}$ is found to be equal to or less than $Y_1$ at step S220, namely if the subject is of ordinary brightness or is dark, then the program proceeds to step S224.

The level of the averaged luminance signal $\overline{Y}$ is compared with a reference value $Y_2$ at step S224. If the level of the averaged luminance signal $\overline{Y}$ is found to be less than $Y_2$ ($Y_2 > \overline{Y}$) at step S224, namely if the subject is dark, then the arithmetic circuit 14B sets $K_j$ to $i_j''$ ($i_j > i_j''$).

If the level of the averaged luminance signal $\overline{Y}$ is found to be equal to or greater than the reference value $Y_2$ at step S224, namely if the subject is of ordinary brightness, then $T_1$, $T_2$, $T_3$, $K_j$ remain at the values set at step S216. Processing then returns to the beginning of the program.

Photography is carried out by repeating the foregoing operation for every field.

Figure 14:
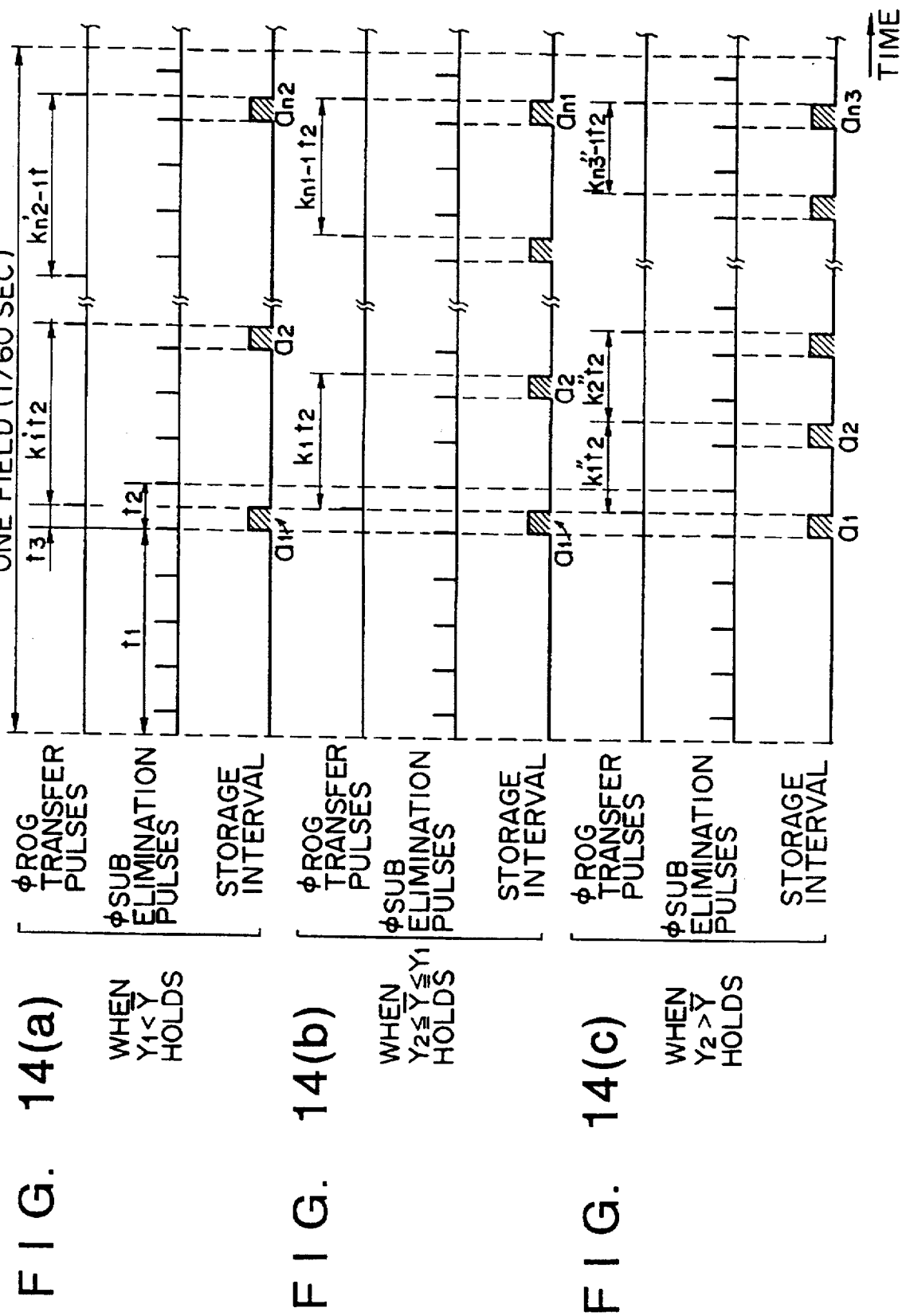
FIG. 14($a$–$c$) is a timing chart in which times $T_1, T_2, T_3$ set by the arithmetic circuit are illustrated with regard to a dynamic mode in the second embodiment.
Figure 15:
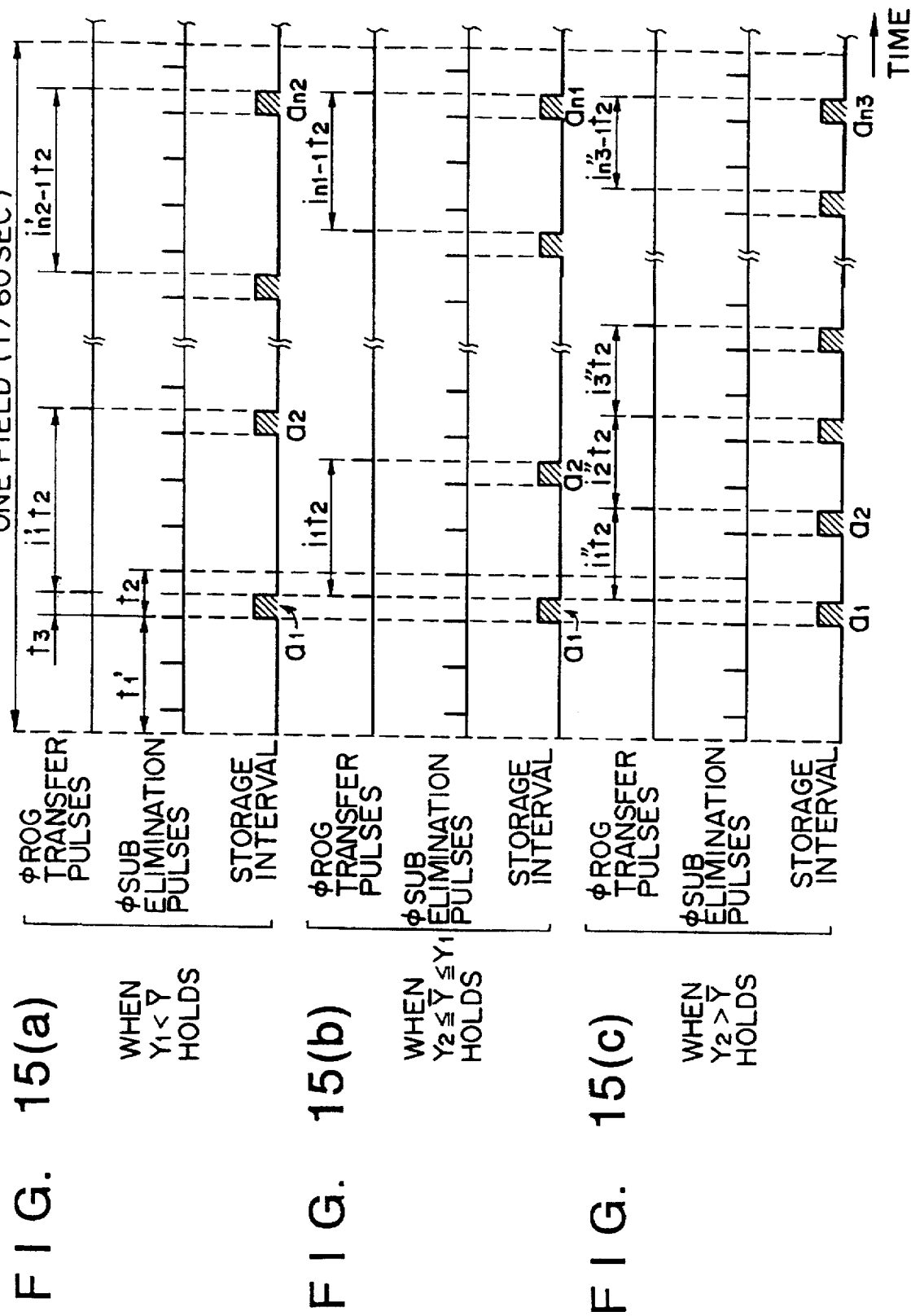
FIG. 15($a$–$c$) is a timing chart in which times $T_1, T_2, T_3$ set by the arithmetic circuit are illustrated with regard to a static mode in the second embodiment.

FIGS. 14 and 15 are timing charts in which $T_1, T_2, T_3$ and $K_j$ set by the arithmetic circuit 14B are illustrated for each mode. FIG. 14 is for the dynamic mode and FIG. 15 for the static mode.

FIG. 14(a), illustrative of the dynamic mode, is for the case where Y1 < $\overline{Y}$ holds, namely for when the subject is bright. $T_1$, $T_2$, $T_3$ and $K_j$ are set to $t_1$, $t_2$, $t_3$ and $k_j$, respectively. In other words, the storage interval is lengthened and the number N of storage operations in one field interval is decreased, i.e., made $n_2$ ($n_2 < n_1$), thereby reducing the total storage time $T_0 = n_2 \times t_3$.

FIG. 14(b) is for the case where Y2 ≤ $\overline{Y}$ ≤ $Y_1$ holds, namely for when the subject is of ordinary brightness. $T_1$, $T_2$, $T_3$ and $K_j$ are left in the state set at the beginning of the algorithm, i.e., $T_1 = t_1$, $T_2 = t_2$, $T_3 = t_3$, $K_j = k_j$. The number N of storage operations in one field interval becomes N = $n_1$ at this time.

FIG. 14(c) is for the case where $Y_2 > \overline{Y}$ holds, namely for when the subject is dark. $T_1$, $T_2$, $T_3$ and $K_j$ are set at $t_1$, $t_2$, $t_3$ and $k_j''$, respectively. In other words, the storage interval is shortened and the number N of storage operations in one field interval is increased, i.e., made $n_3$ ($n_3 > n_1$), thereby increasing the total storage time $T_0 = N \times t_3$.

With regard to the static mode of FIG. 15, the initial settings of $T_1$, $T_2$, $T_3$ and $K_j$ are the same as in the dynamic mode except for settings $T_1 = t_1'$, $T_2 = t_2$, $T_3 = t_3$ and $K_j = i_j$. Accordingly, the settings made are $T_1 = t_1'$, $T_2 = t_2$, $T_3 = t_3$ and $K_j = i_j'$ ($i_j < i_j'$) in the case $Y_1 < \overline{Y}$ shown in (a); $T_1 = t_1'$, $T_2 = t_2$, $T_3 = t_3$ and $K_j = i_j$ in the case $Y_2 \leq \overline{Y} \leq Y_1$ shown in (b); and $T_1 = t_1'$, $T_2 = t_2$, $T_3 = t_3$, $K_j = i_j''$ ($i_j > i_j''$) in the case $Y_2 > \overline{Y}$ shown in (c).

In the method described above, the total storage time $T_0 = N \times T_3$ can be controlled by changing the storage interval ($K_j \times T_2$) (where $K_j$ is a positive integer) to vary the number N of storage operations in one field interval. More specifically, storage time can be changed in accordance with the brightness of the subject, its condition and environment.

Further, by varying the time $T_1$, which extends up to the beginning of storage in one field, in accordance with the moving speed of the subject, an electronic shutter function can be achieved in which dynamic resolution neither deteriorates, even for a fast-moving subject, nor varies depending upon the scene.

Thus, as described above, storage of electric charge is carried out in a dispersed fashion in one field interval so that dynamic resolution can be held constant. Furthermore, by providing modes having different numbers of storage operations in accordance with brightness, the same overall storage time can be controlled to enable error correction in accordance with the conditions of the subject.

<Third Example>

Next, a third example of a method of changing $T_1$, $T_2$, $T_3$ in accordance with the condition of the subject will be described. According to the third example, $T_1$, $T_2$ and $T_3$ are set exactly as in the second example shown in FIGS. 12, 14 and 15 in the operation for the ordinary photographic state. Operation according to this example differs from that of the second example only for the case where the subject is extremely bright.

In the third example, the arithmetic circuit 14B comprising the video camera shown in FIG. 9 has a first driving mode and a second driving mode. The second driving mode is suitable for the case where the subject is extremely bright, and the first driving mode is suitable for others levels of brightness. The changeover between the first and second driving modes is performed automatically by a decision made in the arithmetic circuit 14B in such a manner that the second mode is selected when the output signal $\overline{Y}$ from the averaging circuit 13 satisfies the relation $\overline{Y} > Y_0$ and the first driving mode is selected at all other times.

The flowchart of operation of the first driving mode in the arithmetic circuit 14B is exactly the same as the flowchart of the second example shown in FIG. 13.

Figure 16:
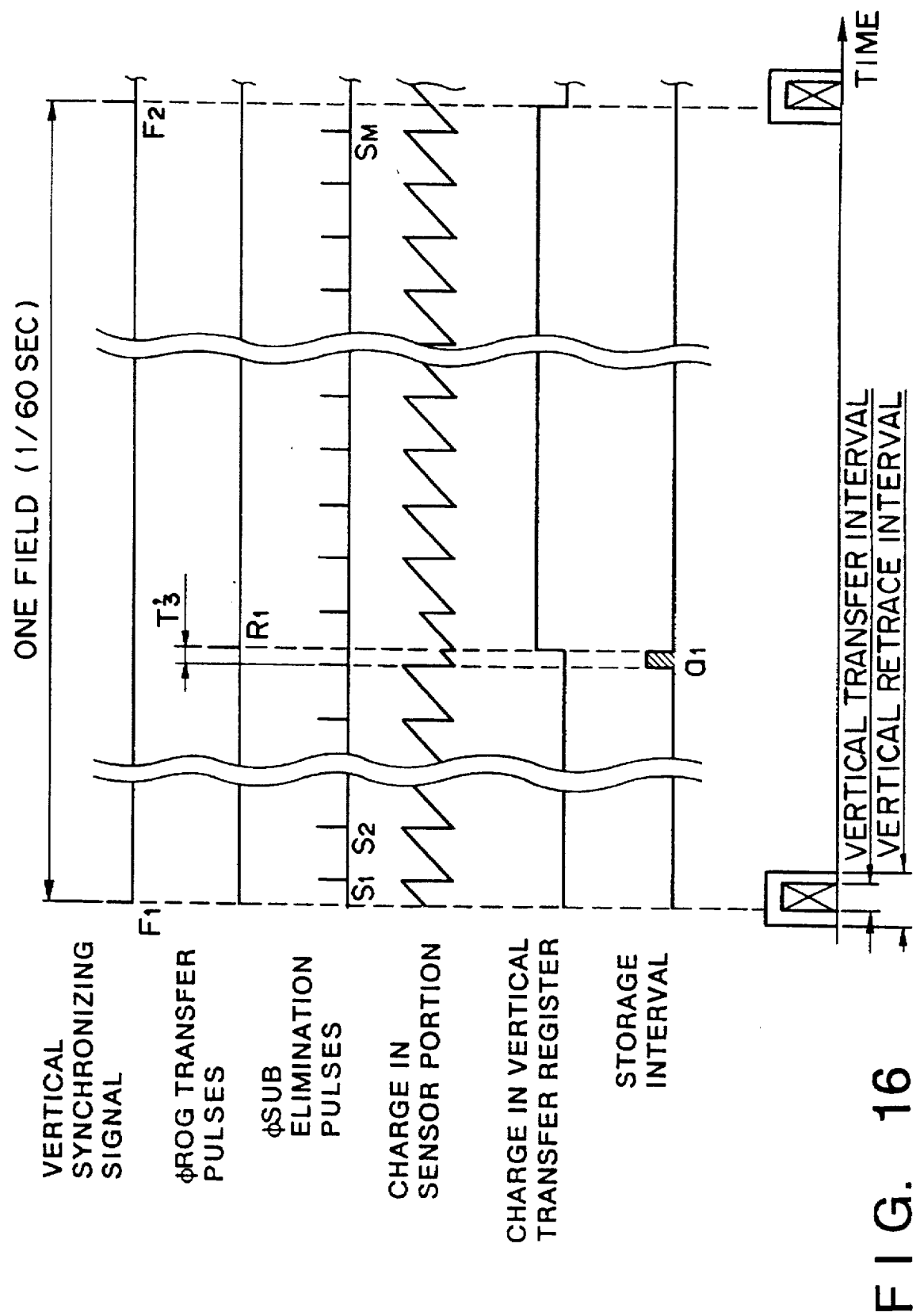
FIG. 16 is a timing chart illustrating the operation of the second driving mode in a third example of the second embodiment.

FIG. 16 is a diagram illustrating the operation of the second driving mode. In the flowchart (FIG. 13) of the first driving mode of arithmetic circuit 14B, the $\phi$ROG transfer pulses are reduced with an increase in the brightness of the subject. As a result, the number N of storage operations in one field interval is reduced and the output of the output amplifier 5 of CCD 11 is rendered constant.

However, in case of an extremely bright subject, namely when the level of the averaged luminance signal $\overline{Y}$ is greater than $Y_0$ (the threshold level of brightness), there are occasions when the output of the output amplifier 5 becomes excessively large even if only one storage operation is performed in a field interval. In such a case, the second mode shown in FIG. 16 is selected within the arithmetic unit 14B, and storage time is set to be short, i.e., $T_3 = T_3'$ ($T_3 < T_3$).

In the method described above, the total storage time $T_0 = N \times T_3$ can be controlled by changing the storage interval ($K_j \times T_2$) (where $K_j$ is a positive integer) to vary the number N of storage operations in one field interval. More specifically, storage time can be in accordance with the brightness of the subject, its condition and environment.

Further, by varying the time $T_1$, which extends up to the beginning of storage in one field, in accordance with the moving speed of the subject, an electronic shutter function can be achieved in which dynamic resolution neither deteriorates, even for a fast-moving subject, nor varies depending upon the scene.

Furthermore, by providing the first driving mode in which storage time $T_3$ is rendered constant and the second driving mode in which storage time $T_3$ is varied in conformity with an extremely bright subject, the various conditions of a subject can be dealt with very flexibly.

<Fourth Example>

Next, a fourth example of a method of changing $T_1$, $T_2$, $T_3$ in conformity with the condition of the subject will be described. According also to the fourth example, $T_1$, $T_2$ and $T_3$ are set exactly as in the second example shown in FIGS. 12, 14 and 15 in the operation for the ordinary photographic state. As in the third example, operation according to this example differs from that of the second example only for a case where the subject is extremely bright.

In the fourth example, the arithmetic circuit 14B constituting the video camera shown in FIG. 9 has a first driving mode and a second driving mode (which differ from the first and second driving modes of the third example). The second driving mode is suitable for a case where the number N of storage operations in one field interval is less than a predetermined value $N_1$, and the first driving mode is suitable for all other cases. The changeover between the first and second driving modes is performed automatically in the arithmetic circuit 14B which discriminates the number N of storage operations in one field interval.

The flowchart of operation of the first driving mode in the arithmetic circuit 14B is exactly the same as the flowchart of the second example shown in FIG. 13.

Figure 17:
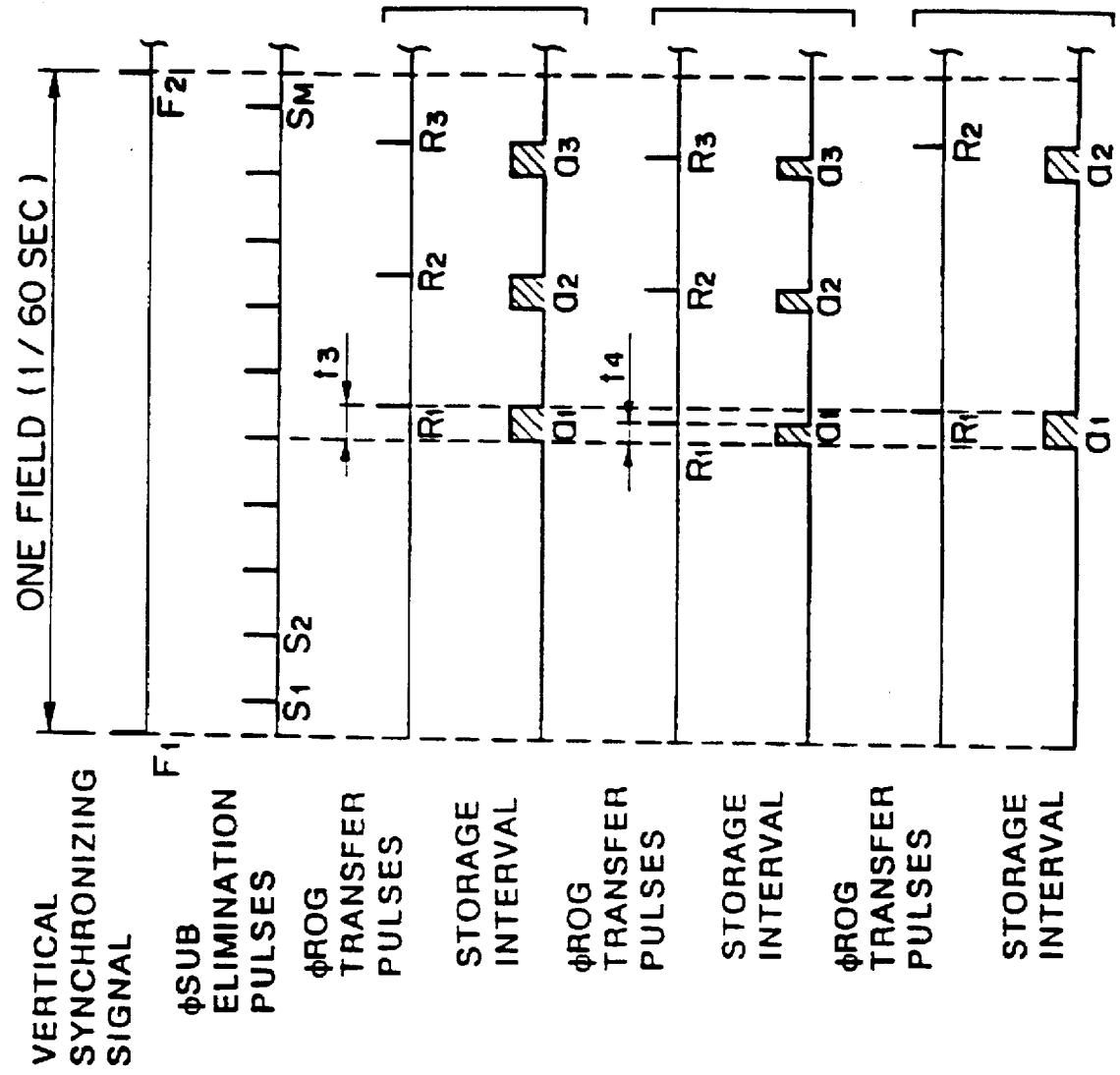
FIG. 17($a$–$c$) is a timing chart illustrating the operation of the second driving mode in a fourth example of the second embodiment.

FIG. 17 is a diagram illustrating the operation of the second driving mode. In the flowchart (FIG. 13) of the first driving mode of arithmetic circuit 14B, the $\phi$ROG transfer pulses are reduced with an increase in the brightness of the subject. As a result, the number N of storage operations in one field interval is reduced and the output of the output amplifier 5 of CCD 11 is rendered constant.

However, in case of an extremely bright subject, the number N of storage operations in one field interval becomes small and the output of the output amplifier 5 undergoes a large change merely by a change of one in the number N. In such case, the fact that the number N of storage operations in one field interval has become smaller than a predetermined value $N_1$ (e.g., $N_1 = 5$) is detected in the arithmetic circuit 14B, and the second driving mode is selected.

In the second driving mode, as shown in FIG. 17, when the number N of storage operations changes from, say, N=3 to N=2, the number N and the storage time $T_3$ are controlled in such a manner that the change in the total storage time $T_0 = N \times T_3$ in one field interval is rendered continuous from the state $T_3 = t_3$, N=3 shown in (a), then temporarily to the state $T_3 = t_4$ ($t_4 < t_3$), N=3 shown in (b), and finally to the state $T_3 = t_3$, N=2 shown in (c). An example in which the number N of storage operations decreases has been described in connection with FIG. 17. In a case where N increases, the change in the total storage time T0 is rendered continuous in the same manner once a setting $T_3=t_4'$ ($t_4'>t_3$) has been made.

In the method described above, the total storage time $T_0$ of one field can be controlled by changing the storage interval ($K_j \times T_2$) (where $K_j$ is a positive integer) to vary the number N of storage operations in one field interval. More specifically, storage time can be used upon being changed depending on the brightness of the subject, its condition and environment.

Further, by varying the time $T_1$, which extends up to the beginning of storage in one field, in conformity with the moving speed of the subject, an electronic shutter function can be achieved in which dynamic resolution neither deteriorates, even for a fast-moving subject, nor varies depending upon the scene.

Furthermore, by providing the first driving mode in which storage time $T_3$ is rendered constant and the second driving mode in which storage time $T_3$ is varied in conformity with an extremely bright subject, the various conditions of a subject can be flexibly dealt with.

(Third Embodiment)

In the first and second embodiments, examples of a method (referred to as multiple exposure) in which storage times are dispersed in one field interval are illustrated. A video camera according to a third embodiment has a first driving mode for performing multiple exposure and a second driving mode, (the conventional electronic shutter operation) for single exposure performing storage of charge continuously.

With regard to the first driving mode, operation is exactly the same as that of the first embodiment and need not be described again. Furthermore, the construction of the video camera to which the third embodiment is applied is the same as that of the first embodiment. However, the changeover between the first and second driving modes is performed by the mode setting circuit 15A.

A method through which the operation (the conventional electronic shutter operation) of the second driving mode is realized by the CCD 11 used in this embodiment will be described with reference to FIG. 18.

As illustrated in FIG. 18, the φROG transfer pulses are applied to the CCD 11 one at a time ($T_{10}$, $T_{11}$, . . . ) in one field interval, and the φSUB elimination pulses are applied to the CCD 11 one at a time ($T_{20}$, . . . ) in the interval between the φROG transfer pulses.

As a result of the foregoing, the sweep-out (elimination) and storage of charge are performed one after another in one field interval. Accordingly, the sum total of the charge produced in the sensor portion 1 over the charging interval A1 comes to be stored in the vertical transfer register 2 immediately after the interval at which the φROG transfer pulse is at the "H" level ends at time $T_{11}$.

Next, the use of the first driving mode (the multiple-exposure mode) and the second driving mode (the conventional electronic-shutter mode) will be described.

In the first driving mode (the multiple-exposure mode), the storage times are evenly distributed discretely in one field interval, as illustrated in FIG. 6. Therefore, this mode is very useful since there is no change in dynamic resolution with regard to a subject whose brightness undergoes a large change with time. Conversely, however, a time difference approximating $\frac{1}{60}$ of a second develops between light received from the subject at storage interval $a_1$ and light received from the subject at storage interval $a_n$.

Consequently, dynamic resolution declines for a fast-moving subject. In addition, though the conventional electronic-shutter mode possesses the above-described drawbacks, the change in dynamic resolution is not very pronounced with regard to a subject exhibiting little change in brightness with time and moving at high speed, and a picture having good dynamic resolution can be taken.

Accordingly, if it is so arranged that the multiple-exposure mode is selected in cases where the subject is slow-moving or its change in brightness is large, and the conventional electronic-shutter mode is selected in a case where subject brightness undergoes a small change with time and is fast-moving, a picture having good dynamic resolution can be taken with little variation in dynamic resolution.

It is possible to execute both the multiple-exposure operation and the conventional electronic shutter operation also in the second embodiment described above. However, $T_1$, $T_2$, $T_3$ must be decided separately in the second embodiment, and this is laborious in terms of control. By contrast, labor involved in control is reduced and the circuit arrangement simplified if, as in the third embodiment, it is so arranged that a subject moving in the ordinary slow manner is dealt with using the multiple-exposure mode, in which exposure intervals are distributed over the entirety of one field interval, while a fast-moving subject is dealt with using the conventional electronic shutter operation. Accordingly, a device such as a video camera employing this embodiment can be achieved with a reduction in cost.

Figure 19:
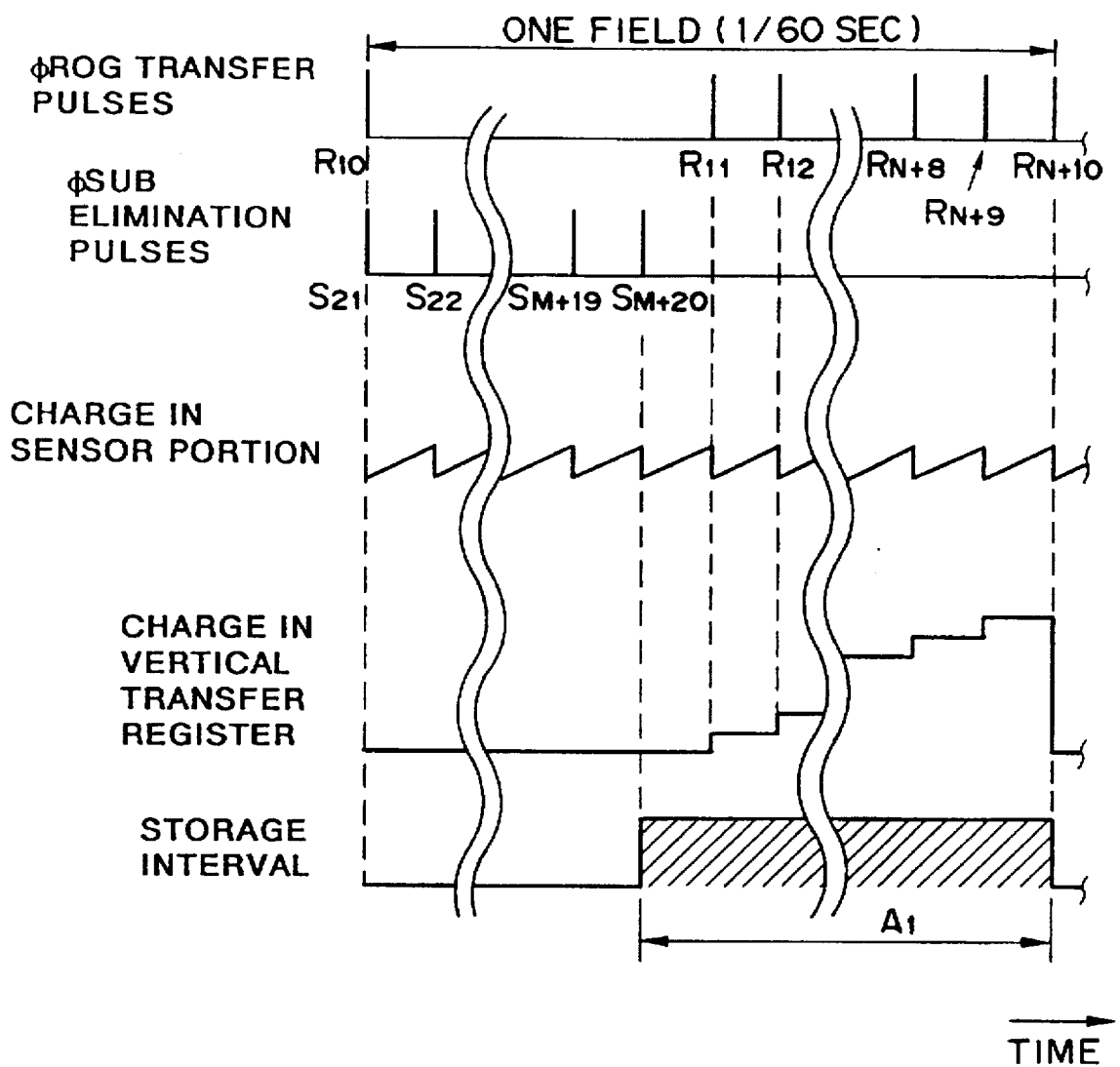
FIG. 19 is a timing chart illustrating a modification of the operation of the second driving mode in the third embodiment.

In the third embodiment, it has been described that one φROG transfer pulse and one φSUB elimination pulse are applied in one field interval in the case of conventional electronic shutter operation. However, as shown in FIG. 19, an arrangement may be adopted in which φSUB elimination pulses $S_{21}$, . . . , $S_{M+20}$, which end before φROG transfer pulses $R_{11}$, . . . , $F_{N+10}$ that are applied in the middle of one field interval, are applied to the CCD 11. The storage interval is $A_1$, as set forth earlier, and the effects obtained are the same as those obtained in the case of FIG. 18.

Thus, a mode for exposure control in which a predetermined number of storage times are distributed evenly at predetermined times in one field interval, and a conventional electronic-shutter mode in which prescribed continuous exposure-time control is performed in one field interval, can be realized merely by changing the control of drive using the same solid-state image sensor. Accordingly, by making appropriate use of either of these two modes or by using them in combination, it is possible to perform exposure control suited to the condition of the subject and the purpose of photography.

(Fourth Embodiment)

A video camera according to a fourth embodiment has a first driving mode for performing the operation illustrated in the second embodiment and a second driving mode for performing the operation of the conventional electronic shutter.

The operation of the first driving mode is exactly the same as that of the second embodiment shown in FIG. 12 and need not be described again. Furthermore, operation for a case where the function of the conventional electronic shutter is implemented using the CCD employed in this embodiment is as set forth in connection with the third embodiment and need not be described again.

If overall storage time $T_0$ for the case where the operation (first driving mode) of the second embodiment is performed is compared with overall storage time for the case where the conventional electronic shutter operation (second driving mode) is performed, it will be found that overall storage time in one field interval according to the second drive mode is as follows, as illustrated in FIG. 18:

$$T_0' = (T_{11} - T_{20}) \quad (1)$$

and that overall storage time in one field interval according to the first drive mode is as follows, as illustrated in FIG. 12:

$$T_0 = (N \times T_3) \quad (2)$$

In addition, the time during which exposure is not performed in one field interval is as follows in the second driving mode:

$$T_{NON}' = (T_{20} - T_{10}) \quad (3)$$

and as follows in the first driving mode:

$$T_{NON} = T_1 + (N-1) \times \{(k \times T_2) - T_3\} \quad (4)$$

More specifically, it is known that the total exposure time $T_0$ in the second driving mode is decided by the number (N) of times exposure is performed and the storage time $T_3$. In addition, it is known from FIG. 12 that dynamic resolution is decided by the time from the beginning to the end of dispersed storage in one field interval, and therefore by $T_1$.

In the first driving mode, the storage operation is dispersed throughout the field interval (referred to as multiple exposure), whereby the amount of exposure (overall exposure time $T_0$) can be controlled while holding $T_1$ constant. As a result, excellent exposure control in which dynamic exposure does not change can be achieved.

When it is desired to change dynamic resolution deliberately, as when analyzing one's form in a sports activity, using the conventional method of electronic-shutter shutter drive, there are occasions where the dynamic resolution changes suddenly and an unnatural picture is produced when changeover is made from the first driving mode (multiple-exposure operation) to the second driving mode (the conventional electronic shutter operation), or vice versa.

Accordingly, the fourth embodiment is so arranged that sudden change in dynamic resolution is suppressed when changing over between the first and second driving modes.

Figure 20A:
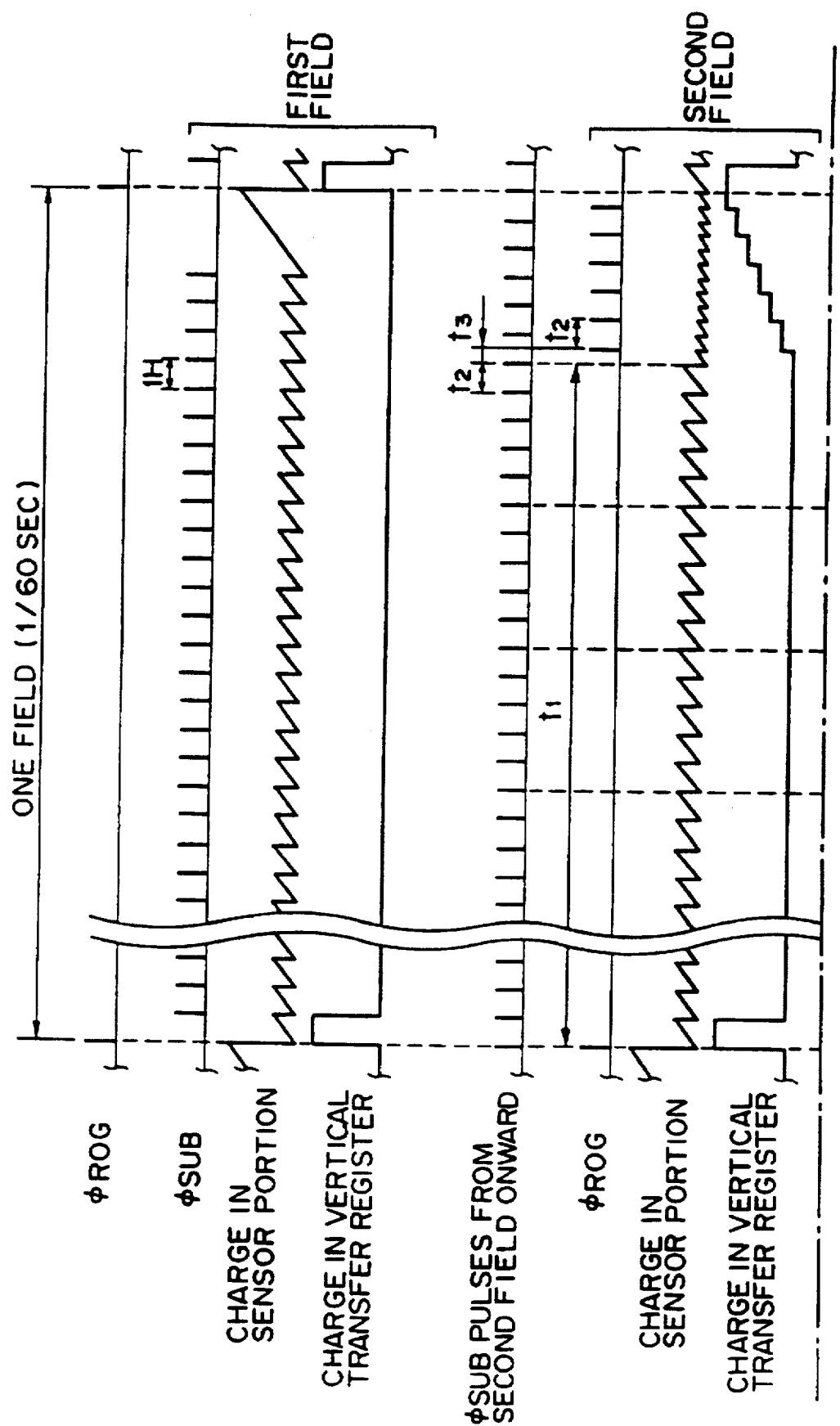
FIG. 20($a$–$b$) is a timing chart illustrating the operation of a fourth embodiment.
Figure 20B:
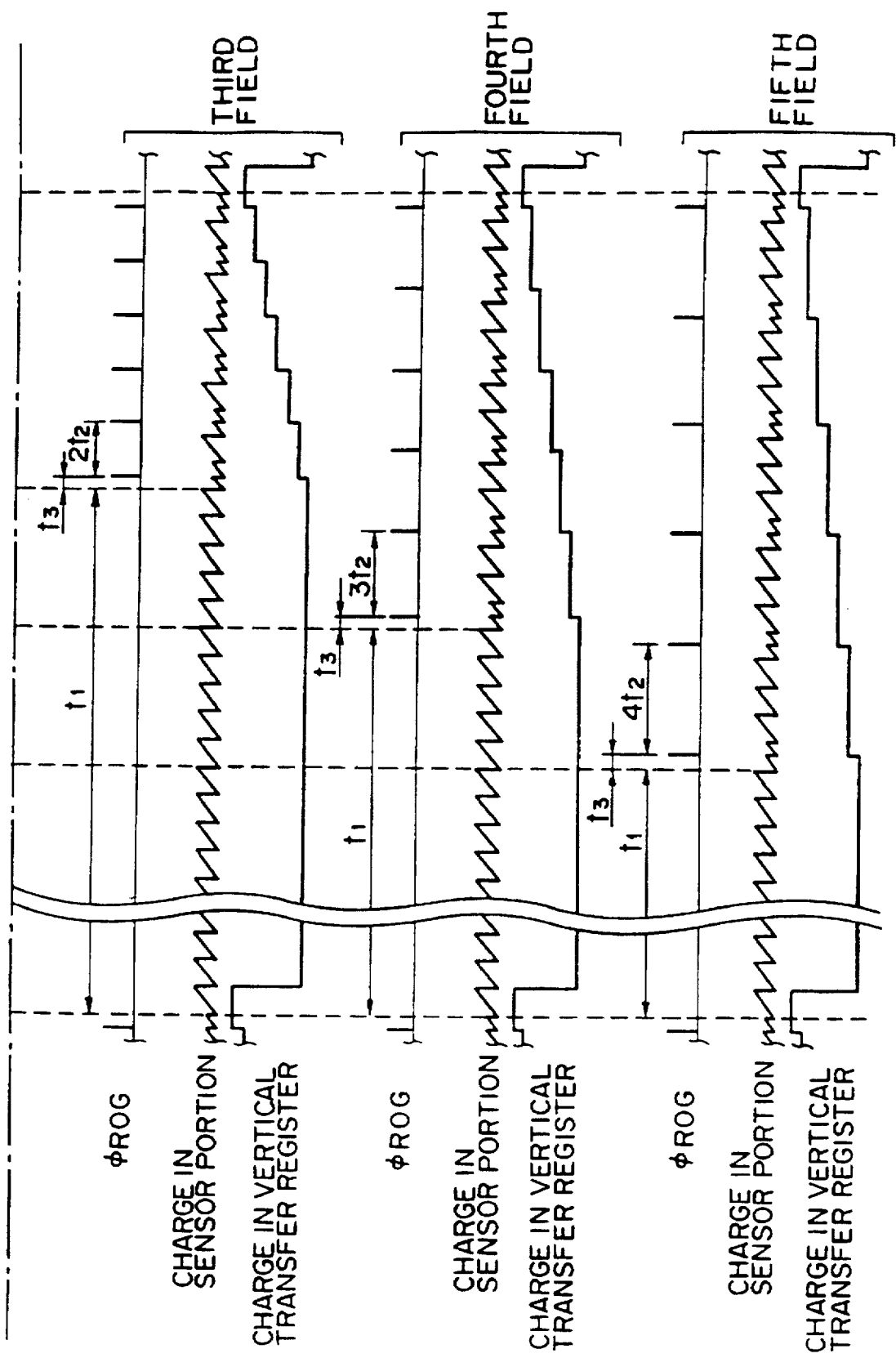

FIG. 20, which is a diagram for describing an operation through which sudden change in dynamic resolution is suppressed, illustrates a case where changeover is made from the second driving mode (the conventional electronic shutter operation) to the first driving mode (the multiple-exposure operation).

A first field in FIG. 20 is for the conventional electronic shutter drive. Here electric charge is stored continuously for only the last 3H of the field.

The φSUB pulses from the second field onward are applied continuously at a time interval $t_2$, where $t_2 = 1H$. In the second field, the multiple-exposure operation is employed, and storage of charge is performed six times intermittently over the last 5.5H of the second field, with $K_j = 1$ in FIG. 12. Here the time $t_3$ satisfies the relation $t_3 = \frac{1}{2}H$, and therefore the overall storage time $T_0$ in one field interval is $6 \times \frac{1}{2}H = 3H$. Thus the overall storage time $T_0$ is the same as that of the first field.

Similarly, storage of charge is performed six times intermittently over 10.5H in the third field, 15.5H in the fourth field and 20.5H in the fifth field. If storage of charge is performed intermittently over $\{(n-1) \times 5 + 0.5\}H$ in the $n^{th}$ field from the sixth field onward as well, dynamic resolution can be changed gradually, while maintaining the same exposure time, until the interval over which charge is intermittently stored takes on the maximum value in one field.

In a case where a changeover is made from the first driving mode (the multiple-exposure operation) to the second driving mode (the conventional electronic exposure operation), a sudden change in dynamic exposure can be suppressed in a similar manner if operation which is the reverse of the foregoing is carried out.

Thus, in accordance with the fourth embodiment, as described above, storage intervals are distributed evenly in dispersed fashion in one field interval, whereby it is possible to perform exposure control, which provides a natural appearance, by the solid-state image sensor itself, without the observer being made aware of a change in dynamic resolution.

In a case where dynamic resolution is changed deliberately, exposure control providing a natural appearance can be performed, without the observer being made aware of the change in dynamic resolution when the changeover is made from the conventional electronic shutter operation to the multiple-exposure mode, by gradually varying the distribution of storage times in one field interval.

The present invention can be modified in various ways without departing from the scope of the claims.

For example, though one field interval is $\frac{1}{60}$ of a second in the foregoing embodiments, the invention is not restricted to this time. In addition, the invention may be applied not only to a two-dimensional sensor but also to a one-dimensional sensor.

In the fourth embodiment, the relation $t_3/\frac{1}{2}H$ is described as holding. However, the time may be set to, e.g., $\frac{1}{3}H$, $\frac{1}{4}H$, etc.

The present invention is not limited to the above embodiments and various changes and modifications can be made within the spirit and scope of the present invention. Therefore, to apprise the public of the scope of the present invention, the following claims are made.

What is claimed is:

1. A drive apparatus for a solid-state image sensor comprising:

sensing means for receiving a light signal, performing a photoelectric conversion and storing information;

first memory means for reading in the information from said sensing means;

second memory means for storing information from said first memory means; and eliminating means for eliminating information from said sensing means;

the information in said sensing means being eliminated by said eliminating means intermittently two or more times in one field interval, thereby controlling information storage time;

wherein the apparatus has:

a first driving mode in which, in one field interval, operation of said eliminating means is performed each second predetermined time $t_2$ after a first predetermined time $t_1$ from a vertical synchronizing signal, and the information from said sensing means is read in said first memory means, at every one of a predetermined number n of operations among the operations of the eliminating means, a third predetermined time $t_3$ after the end of each of these operations; and a second driving mode in which, in one field interval, the information from said sensing means is read in said first memory means after completion of all operations of said eliminating means in one field interval;

the first predetermined time $t_1$ and predetermined number of times n being gradually changed when said first driving mode and said second driving mode are changed over, with the total storage time being held constant.

2. The apparatus according to claim 1, wherein timing at which information is moved from said sensing means to said first memory means and timing at which information is eliminated from said sensing means fall within a horizontal retrace interval, or in the proximity thereof, of a standard television signal.

3. The apparatus according to claim 1, wherein said first memory means includes a vertical transfer register.

4. The apparatus according to claim 1, wherein said second memory means has enough capacity for storing one field of a signal charge.

* * * * *

UNITED STATES PATENT AND TRADEMARK OFFICE
CERTIFICATE OF CORRECTION

PATENT NO. : 5,675,381   Page 1 of 3
DATED : October 7, 1997
INVENTOR(S) : TERUO HIEDA, ET AL.

It is certified that error appears in the above-identified patent and that said Letters Patent is hereby corrected as shown below:

TITLE PAGE:

At [30] Foreign Application Priority Data

Insert --October 31, 1990 [JP] Japan ... 2-291820--.

At [56]   References Cited

"1165270    6/1989    Japan
     1176173    7/1989    Japan
     2142183    5/1990    Japan" should read --1-165270  6/1989    Japan
      1-176173  7/1989    Japan
      2-142183  5/1990    Japan--.

Column 1

Line 7, "1991." should read --1991, now abandoned.--.
    Line 48, "(high)" should read --(high),--.
    Line 59, "pulses" should read --pulse--.

Column 2

Line 33, "for for" should read --for--.

Column 3

Line 67, "a preferred embodiment" should read
--preferred embodiments-- and "will" should read
--which--.

UNITED STATES PATENT AND TRADEMARK OFFICE
CERTIFICATE OF CORRECTION

PATENT NO. : 5,675,381  Page 2 of 3

DATED : October 7, 1997

INVENTOR(S) : TERUO HIEDA, ET AL.

It is certified that error appears in the above-identified patent and that said Letters Patent is hereby corrected as shown below:

Column 4

Line 1, "follows." should read --follow.--
Line 3, "illustrates" should read --illustrate--.

Column 6

Line 7, "$SN_1$" should read --$S_{N1}$--.

Column 7

Line 6, "charge-" should read --charge--.

Column 9

Line 23, "<First" should read --¶ <First--.

Column 10

Line 4, "set," should read --set--.
Line 28, "to" should read --it--.

Column 11

Line 63, "the" should be deleted.

UNITED STATES PATENT AND TRADEMARK OFFICE
CERTIFICATE OF CORRECTION

PATENT NO. : 5,675,381
DATED : October 7, 1997
INVENTOR(S) : TERUO HIEDA, ET AL.

It is certified that error appears in the above-identified patent and that said Letters Patent is hereby corrected as shown below:

<u>Column 13</u>

Line 35, "$T_3$" should read --and $T_3$--.

<u>Column 14</u>

Line 4, "$(T_3<T_3)$." should read --$(T_3'<T_3)$.--
　　　Line 23, "$T_3$ in conformity" should read --and $T_3$ in accordance--.

<u>Column 15</u>

Line 31, "exposure" should read --exposure,--

<u>Column 17</u>

Line 33, "shutter" should be deleted.

Signed and Sealed this

Seventh Day of July, 1998

Attest:

BRUCE LEHMAN

*Attesting Officer*　　*Commissioner of Patents and Trademarks*